(12) United States Patent
Gerlach et al.

(10) Patent No.: US 10,895,183 B2
(45) Date of Patent: Jan. 19, 2021

(54) RUTHENIUM IMPREGNATED CERIA CATALYST

(71) Applicant: BASF Corporation, Florham Park, NJ (US)

(72) Inventors: Olga Gerlach, Ludwigshafen (DE); Xinyi Wei, Princeton, NJ (US); Andreas Sundermann, Bensheim (DE); Emily Schulman, Princeton, NJ (US); Stanley A. Roth, Yardley, PA (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 16/259,267

(22) Filed: Jan. 28, 2019

(65) Prior Publication Data

US 2019/0153921 A1 May 23, 2019

Related U.S. Application Data

(63) Continuation of application No. PCT/IB2017/054582, filed on Jul. 27, 2017.
(Continued)

(51) Int. Cl.
*F01N 3/08* (2006.01)
*B01J 23/63* (2006.01)
(Continued)

(52) U.S. Cl.
CPC ....... *F01N 3/0842* (2013.01); *B01D 53/0407* (2013.01); *B01D 53/9459* (2013.01);
(Continued)

(58) Field of Classification Search
CPC .... F01N 3/2828; F01N 3/2066; F01N 3/0814; F01N 3/0842
(Continued)

(56) References Cited

U.S. PATENT DOCUMENTS 4,961,917 A 10/1990 Byrne
5,516,497 A 5/1996 Speronello et al.
(Continued)

FOREIGN PATENT DOCUMENTS

JP H0760114 A 3/1995
JP H10128105 A 5/1998
(Continued)

*Primary Examiner* — Tom P Duong
(74) *Attorney, Agent, or Firm* — Finnegan, Henderson, Farabow, Garrett & Dunner LLP

(57) ABSTRACT

The present disclosure generally provides low-temperature nitrogen oxides ($NO_x$) adsorbers used in the treatment of a $NO_x$-containing exhaust gas stream and to methods of preparing and using the same. In particular, the $NO_x$ adsorber composition includes an active metal and a metal oxide support, wherein the metal oxide support includes greater than 50% by weight ceria based on the total weight of the $NO_x$ adsorber composition, and wherein the active metal includes about 0.01% to about 5% by weight ruthenium based on the total weight of the $NO_x$ adsorber composition.

20 Claims, 13 Drawing Sheets

Related U.S. Application Data

(60) Provisional application No. 62/368,404, filed on Jul. 29, 2016.

(51) Int. Cl.
| | | |
|---|---|---|
| B01J 35/04 | (2006.01) | |
| B01J 37/02 | (2006.01) | |
| B01D 53/94 | (2006.01) | |
| B01J 35/10 | (2006.01) | |
| F01N 3/20 | (2006.01) | |
| B01D 53/04 | (2006.01) | |
| B01J 20/06 | (2006.01) | |
| F01N 3/28 | (2006.01) | |

(52) U.S. Cl.
CPC .......... *B01D 53/9481* (2013.01); *B01J 20/06* (2013.01); *B01J 23/63* (2013.01); *B01J 35/04* (2013.01); *B01J 35/10* (2013.01); *B01J 37/0201* (2013.01); *B01J 37/0248* (2013.01); *F01N 3/0814* (2013.01); *F01N 3/20* (2013.01); *F01N 3/2066* (2013.01); *F01N 3/2828* (2013.01); *B01D 2253/1124* (2013.01); *B01D 2255/91* (2013.01); *B01D 2255/9155* (2013.01); *F01N 2250/12* (2013.01); *F01N 2570/145* (2013.01)

(58) Field of Classification Search
USPC .................................. 422/170, 171; 60/286
See application file for complete search history.

(56) References Cited

U.S. PATENT DOCUMENTS

| | | |
|---|---|---|
| 5,840,649 A | 11/1998 | Ichiki et al. |
| 7,189,375 B2 * | 3/2007 | Molinier .............. B01D 53/944 422/171 |
| 2007/0014710 A1 | 1/2007 | Gerlach et al. |
| 2007/0144153 A1 * | 6/2007 | Gandhi .............. B01D 53/8631 60/286 |
| 2013/0288890 A1 | 10/2013 | Hikazudani et al. |
| 2014/0161695 A1 * | 6/2014 | Hilgendorff ......... B01J 37/0244 423/213.5 |
| 2015/0266002 A1 | 9/2015 | Biberger et al. |
| 2016/0136626 A1 * | 5/2016 | Phillips .............. B01D 53/9477 423/239.2 |
| 2017/0167346 A1 * | 6/2017 | Barba ................... F01N 3/0842 |

FOREIGN PATENT DOCUMENTS

| | | |
|---|---|---|
| JP | 2005342604 A | 12/2005 |
| KR | 100321470 B1 | 6/2002 |
| WO | 2016094399 | 6/2016 |

* cited by examiner

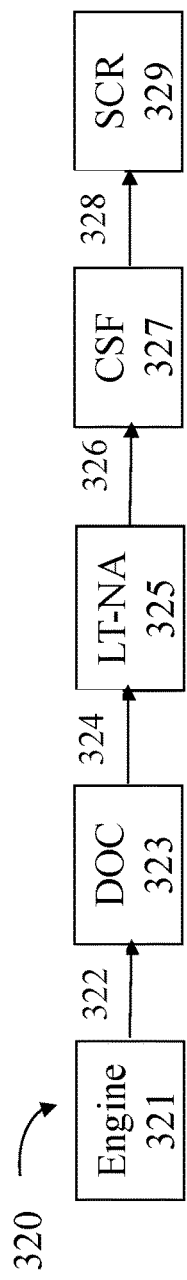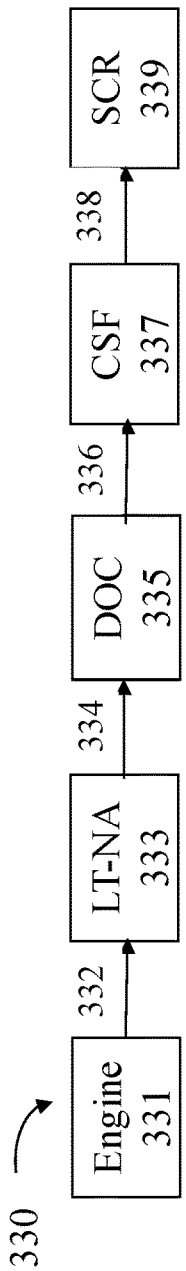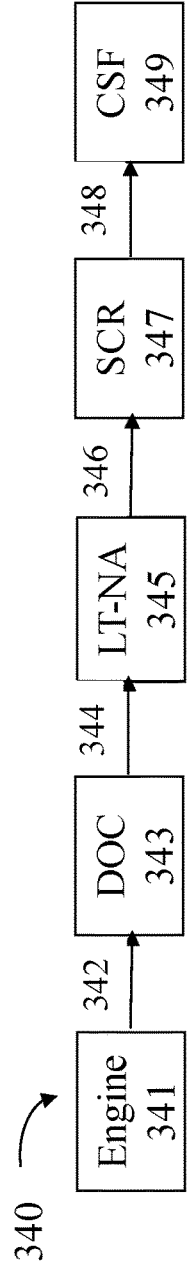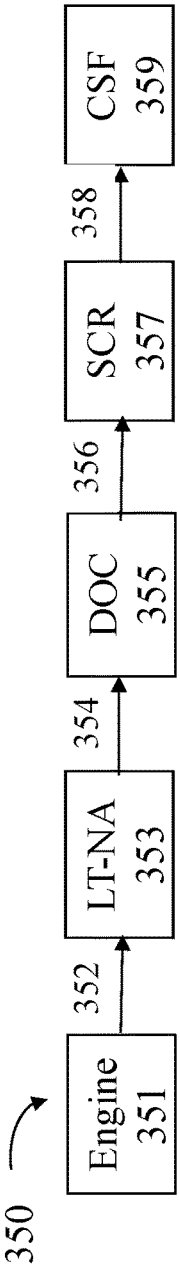

RUTHENIUM IMPREGNATED CERIA CATALYST

CROSS-REFERENCE TO RELATED APPLICATIONS

This application is a continuation of International App. No. PCT/IB2017/054582; filed Jul. 27, 2017, which International Application was published by the International Bureau in English on Feb. 1, 2018, and claims priority to U.S. Provisional Application No. 62/368,404, filed Jul. 29, 2016, each of which is incorporated by reference in their entirety and for all purposes.

FIELD OF THE INVENTION

The present invention relates generally to the field of nitrogen oxides ($NO_x$) adsorbers used in the treatment of a $NO_x$-containing exhaust gas stream and to methods of preparing and using the same.

BACKGROUND OF THE INVENTION

A major problem encountered in the treatment of automotive exhaust gas streams is the so-called "cold start" period, which is the time period at the beginning of the treatment process, when the exhaust gas stream and the exhaust gas treatment system are at low temperatures (i.e., below 150° C.). At these low temperatures, exhaust gas treatment systems generally do not display sufficient catalytic activity for effectively treating hydrocarbons (HC), nitrogen oxides ($NO_x$) and/or carbon monoxide (CO) emissions. As a result, considerable efforts have been made to alleviate this problem. For instance, new trapping systems have been developed, which can store these exhaust gas emissions at low temperatures and subsequently release them (i.e., HC, CO and $NO_x$ gases) at higher temperatures, when the remaining catalytic components of the treatment system have attained sufficient catalytic activity.

For example, zeolites are often used as adsorbent materials in catalytic treatment systems in order to adsorb and retain gaseous hydrocarbon pollutants during the initial cold-start period. As the exhaust gas temperature increases, the adsorbed hydrocarbons are driven from the adsorbent material and subjected to catalytic oxidation at higher temperatures. However, the $NO_x$-adsorber technology has been limited to use in lean $NO_x$ trap (LNT) applications where $NO_x$ (NO and $NO_2$) is adsorbed on base metal oxides (BaO, MgO, $CeO_2$ etc) under lean conditions and then released and reduced under transient rich conditions. The NO to $NO_2$ conversion is a prerequisite to efficient $NO_x$ trapping, however the reaction rate is very slow when temperature is below 200° C., which renders traditional LNT catalyst unsuitable for trapping of cold-start $NO_x$ emission.

Due to emission regulations becoming increasingly more stringent, it would be highly desirable to provide an improved $NO_x$ storage component to capture cold-start $NO_x$ emission. As >80% of cold-start $NO_x$ emission consists of NO, it is imperative that advanced $NO_x$ adsorption materials have great efficiency for NO adsorption.

SUMMARY OF THE INVENTION

In general, catalytic components such as SCR catalysts are very effective in converting $NO_x$ to $N_2$ at temperatures above 200° C. but do not exhibit sufficient activities at lower temperature regions (<200° C.) such as that found during cold-start or prolonged low-speed city driving. Therefore, catalytic components capable of capturing and storing such low-temperature $NO_x$ emissions, and being able to release it at higher temperatures (>200° C.) when catalytic components (i.e. SCR catalysts) become effective are in great demand.

As such, the present disclosure generally provides such catalysts, catalyst articles and catalyst systems comprising such catalyst articles. In particular, such articles and systems comprise a $NO_x$ adsorber suitable for adsorbing $NO_x$ at low temperatures and releasing trapped $NO_x$ at elevated temperatures. In particular the $NO_x$ adsorber composition of the current invention maintains adsorbing properties even in the presence of water vapor (steam) and carbon dioxide ($CO_2$) compared to conventional $NO_x$ adsorbers, which exhibit a lower adsorption capacity in the presence of steam and $CO_2$. The $NO_x$ adsorber composition of the current invention is unique in that it adsorbs NO at low temperatures, while previous LNT catalysts primarily adsorb $NO_2$.

In this regard, aspects of the current invention are directed to a low-temperature $NO_x$ adsorber composition comprising an active metal and a metal oxide support, wherein the metal oxide support comprises greater than 50% by weight ceria based on the total weight of the $NO_x$ adsorber composition, and wherein the active metal comprises about 0.01% to about 5% by weight ruthenium based on the total weight of the $NO_x$ adsorber composition. In some embodiments, the $NO_x$ adsorber composition is substantially free of zirconium. In some embodiments, the $NO_x$ adsorber composition is substantially free of barium or zeolites. In other embodiments, the metal oxide support comprises greater than 90% by weight ceria based on the total weight of the $NO_x$ adsorber composition. In some embodiments, the metal oxide support comprises at least one additional metal oxide, wherein the at least one additional metal oxide is a rare earth metal oxide. In some embodiment, the additional metal oxide is selected from $Pr_6O_{11}$, $ZrO_2$, $Gd_2O_3$, and combinations thereof. In some embodiment, the additional metal oxide is present in an amount of about 0.1% to about 10% by weight based on the total weight of the $NO_x$ adsorber composition. In some embodiments, the $NO_x$ adsorber composition comprises a surface concentration of active Ru ions of at least 0.5% by weight based on the total weight of the $NO_x$ adsorber composition. In some embodiments, the $NO_x$ adsorber composition adsorbs NO from the exhaust gas stream at a temperature of about 50° C. to about 200° C. in an amount of at least 30-60% by weight based on the total amount of NO present in the exhaust gas stream. In some embodiments, the low-temperature $NO_x$ adsorber composition oxidizes NO present in the exhaust gas steam to $NO_2$ at a temperature ranging from about 300° C. to about 600° C. In some embodiments, the low-temperature $NO_x$ adsorber composition releases NO back into the exhaust gas stream at a temperature of about 170° C. to about 300° C. in an amount of at least 55% to about 100% by weight based on the total amount of NO adsorbed onto the $NO_x$ adsorber composition. In some embodiments, the catalyst composition is substantially free of any additional active metal. In some embodiments, the $NO_x$ adsorber composition is included in a lean $NO_x$ trap.

Another aspect of the invention is directed to a catalyst article comprising a substrate carrier having a plurality of channels adapted for gas flow and a $NO_x$ adsorber composition according to the invention positioned to contact an exhaust gas passing through each channel. In some embodiments, the substrate carrier is a metal or ceramic honeycomb. In another embodiment, the honeycomb is a wall flow filter substrate or a flow through substrate. In another embodiment, the NO$_x$ adsorber is applied to the substrate carrier with a loading of at least about 0.5 g/in$^3$. In another embodiment, the active metal is present in an amount of about 10 to about 200 g/ft$^3$. In some embodiments, the catalyst article further comprises a second catalyst composition, wherein the second catalyst composition comprises a DOC catalyst composition or a LNT catalyst composition; and wherein the second catalyst composition is layered or zoned on the substrate carrier with the NO$_x$ adsorber composition. In some embodiments, the second catalyst composition is disposed directly on the substrate carrier.

Another aspect of the invention is directed to an exhaust gas treatment system comprising a NO$_x$ adsorber composition and an SCR catalyst positioned downstream from an internal combustion engine. In some embodiments, the NO$_x$ adsorber composition is disposed on a substrate carrier and is positioned upstream of the SCR catalyst. In another embodiment, the NO$_x$ adsorber composition and SCR catalyst are disposed on the same substrate. In another embodiment, the internal combustion engine is a gasoline or a diesel engine.

The invention includes, without limitation, the following embodiments.

Embodiment 1: A low-temperature NO$_x$ adsorber composition comprising: an active metal and a metal oxide support, wherein the metal oxide support comprises greater than 50% by weight ceria based on the total weight of the NOx adsorber composition, and wherein the active metal comprises about 0.01% to about 5% by weight ruthenium based on the total weight of the NO$_x$ adsorber composition.

Embodiment 2: The low-temperature NO$_x$ adsorber composition of any preceding or subsequent embodiment, wherein the low-temperature NO$_x$ adsorber composition is substantially free of zirconium.

Embodiment 3: The low-temperature NO$_x$ adsorber composition of any preceding or subsequent embodiment, wherein the low-temperature NO$_x$ adsorber composition is substantially free of barium or zeolite.

Embodiment 4: The low-temperature NO$_x$ adsorber composition of any preceding or subsequent embodiment, wherein the metal oxide support comprises greater than 90% by weight ceria based on the total weight of the NO$_x$ adsorber.

Embodiment 5: The low-temperature NO$_x$ adsorber composition of any preceding or subsequent embodiment, wherein the metal oxide support comprises at least one additional metal oxide, wherein the at least one additional metal oxide is a rare earth metal oxide.

Embodiment 6: The low-temperature NO$_x$ adsorber composition of any preceding or subsequent embodiment, wherein the at least one additional metal oxide is selected from $Pr_6O_{11}$, $ZrO_2$, $Gd_2O_3$, and combinations thereof.

Embodiment 7: The low-temperature NO$_x$ adsorber composition of any preceding or subsequent embodiment, wherein the metal oxide support comprises at least one additional metal oxide in an amount of about 0.1% to about 10% by weight based on the total weight of the NOx adsorber composition.

Embodiment 8: The low-temperature NO$_x$ adsorber composition of any preceding or subsequent embodiment, wherein the NO$_x$ adsorber composition comprises a surface concentration of active Ru ions of at least 0.5% by weight based on the total weight of the NO$_x$ adsorber composition.

Embodiment 9: The low-temperature NO$_x$ adsorber composition of any preceding or subsequent embodiment, wherein the NO$_x$ adsorber composition adsorbs NO from the exhaust gas stream at a temperature of about 50° C. to about 200° C. in an amount of at least 30-60% by weight based on the total amount of NO present in the exhaust gas stream.

Embodiment 10: The low-temperature NO$_x$ adsorber composition of any preceding or subsequent embodiment, wherein the NO$_x$ adsorber composition oxidizes NO present in the exhaust gas steam to NO$_2$ at a temperature ranging from about 300° C. to about 600° C.

Embodiment 11: The low-temperature NO$_x$ adsorber composition of any preceding or subsequent embodiment, wherein the NO$_x$ adsorber composition releases NO back into the exhaust gas stream at a temperature of about 170° C. to about 300° C. in an amount of at least 55 to about 100% by weight based on the total amount of NO adsorbed onto the NO$_x$ adsorber composition.

Embodiment 12: The low-temperature NO$_x$ adsorber composition of any preceding or subsequent embodiment, wherein the NO$_x$ adsorber composition is substantially free of any additional active metal.

Embodiment 13: The low-temperature NO$_x$ adsorber composition of any preceding or subsequent embodiment, wherein the NO$_x$ adsorber composition is comprised in a lean NO$_x$ trap.

Embodiment 14: A catalyst article comprising a catalyst substrate carrier having a plurality of channels adapted for gas flow and a low temperature NO$_x$ adsorber composition according to any preceding or subsequent embodiment positioned to contact an exhaust gas passing through each channel.

Embodiment 15: The catalyst article of any preceding or subsequent embodiment, wherein the substrate carrier is a metal or ceramic honeycomb.

Embodiment 16: The catalyst article of any preceding or subsequent embodiment, wherein the honeycomb is a wall flow filter substrate or a flow through substrate.

Embodiment 17: The catalyst article of any preceding or subsequent embodiment, wherein the low temperature NO$_x$ adsorber composition is applied to the substrate carrier with a loading of at least about 0.5 g/in$^3$.

Embodiment 18: The catalyst article of any preceding or subsequent embodiment, wherein the active metal is present in an amount of about 10 to about 200 g/ft$^3$.

Embodiment 19: The catalyst article of any preceding or subsequent embodiment, further comprising a second catalyst composition, wherein the second catalyst composition comprises a DOC catalyst composition or a LNT catalyst composition; and wherein the second catalyst composition is layered or zoned on the substrate carrier with the NO$_x$ adsorber catalyst composition.

Embodiment 20: The catalyst article of any preceding or subsequent embodiment, wherein the second catalyst composition is disposed directly on the substrate carrier.

Embodiment 21: An exhaust gas treatment system comprising a low-temperature NO$_x$ adsorber composition according to any preceding or subsequent embodiment and an SCR catalyst disposed downstream from an internal combustion engine.

Embodiment 22: The exhaust gas treatment system of any preceding or subsequent embodiment, wherein the low-temperature NO$_x$ adsorber composition is present on a substrate carrier positioned upstream of the SCR catalyst.

Embodiment 23: The exhaust gas treatment system of any preceding or subsequent embodiment, wherein the low-temperature $NO_x$ adsorber composition and SCR catalyst are disposed on the same substrate carrier.

Embodiment 24: The exhaust gas treatment system of any preceding or subsequent embodiment, wherein the internal combustion engine is a gasoline or a diesel engine.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

FIG. 4A shows a schematic depiction of an embodiment of an emission treatment system in which a low-temperature $NO_x$ adsorber (LT-NA) of the present invention is utilized, wherein the LT-NA is located downstream of a diesel oxidation catalyst (DOC) and upstream of a catalyzed soot filter (CSF) and selective catalytic reduction catalyst (SCR);

FIG. 4B shows a schematic depiction of an embodiment of an emission treatment system in which a low-temperature $NO_x$ adsorber (LT-NA) of the present invention is utilized, wherein the LT-NA is located upstream of a diesel oxidation catalyst (DOC), a catalyzed soot filter (CSF), and selective catalytic reduction catalyst (SCR);

FIG. 4C shows a schematic depiction of an embodiment of an emission treatment system in which a low-temperature $NO_x$ adsorber (LT-NA) of the present invention is utilized, wherein the LT-NA is located downstream of a diesel oxidation catalyst (DOC) and upstream of a selective catalytic reduction catalyst (SCR) and a catalyzed soot filter (CSF);

FIG. 4D shows a schematic depiction of an embodiment of an emission treatment system in which a low-temperature $NO_x$ adsorber (LT-NA) of the present invention is utilized, wherein the LT-NA is upstream of a diesel oxidation catalyst (DOC), a selective catalytic reduction catalyst (SCR) and a catalyzed soot filter (CSF);

DETAILED DESCRIPTION OF THE PREFERRED EMBODIMENTS

Figure 1:
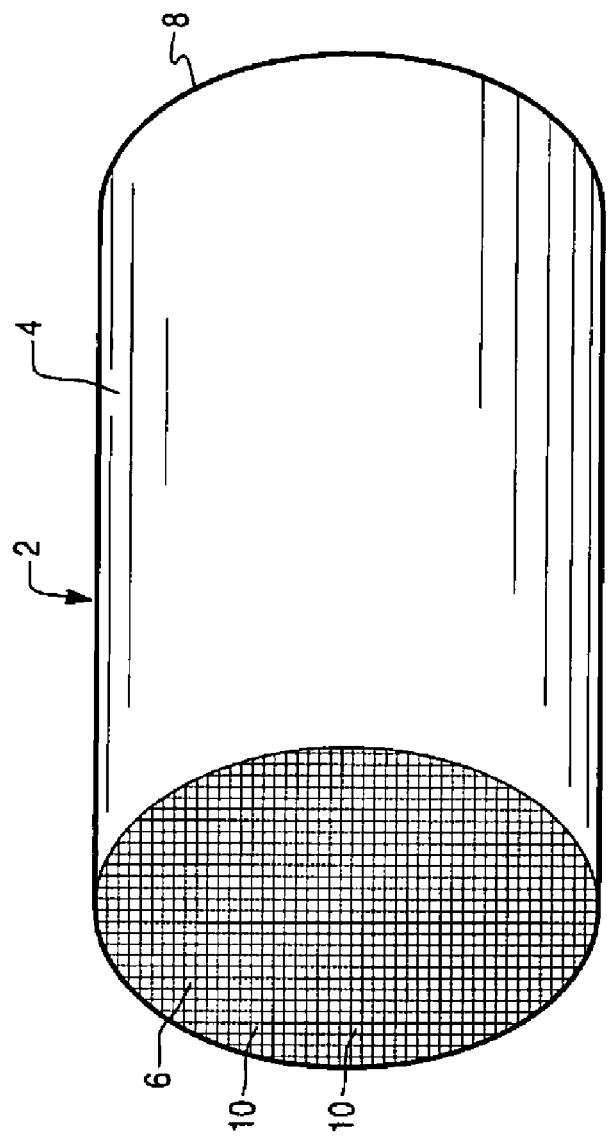
FIG. 1 is a perspective view of a honeycomb-type substrate carrier which may comprise a catalyst article (i.e., low-temperature $NO_x$ adsorber (LT-NA)) washcoat composition in accordance with the present invention.

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise.

The present disclosure provides catalysts, catalyst articles and catalyst systems comprising such catalyst articles suitable for the adsorption and subsequent thermal release of $NO_x$. In particular, such articles and systems comprise a $NO_x$ adsorber suitable for adsorbing $NO_x$ at low temperatures (LT-NA) and thermally releasing trapped $NO_x$ at elevated temperatures. This is of particular importance when the low-temperature $NO_x$ adsorber is placed upstream of a SCR catalyst that is very effective in converting $NO_x$ to $N_2$ at temperatures above 200° C., but does not exhibit sufficient activities at lower temperature regions (<200° C.) such as during cold-start and before urea can be injected into the exhaust. Beneficially, the $NO_x$ adsorber of the current invention maintains adsorbing properties even in the presence of steam and carbon dioxide in contrast to conventional $NO_x$ adsorbers, which exhibit a decline in adsorption capacity when steam and $CO_2$ is present.

As used herein, the term "catalyst" or "catalyst composition" refers to a material that promotes a reaction. As used herein, the phrase "catalyst system" refers to a combination of two or more catalysts, for example a combination of a first low-temperature $NO_x$ adsorber (LT-NA) catalyst and a second catalyst which may be a diesel oxidation catalyst (DOC), a lean $NO_x$ trap (LNT) or a selective catalytic reduction (SCR) catalyst. The catalyst system may alternatively be in the form of a washcoat in which the two catalysts are mixed together or coated in separate layers.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine.

As used herein, the term "stream" broadly refers to any combination of flowing gas that may contain solid or liquid particulate matter. The term "gaseous stream" or "exhaust gas stream" means a stream of gaseous constituents, such as the exhaust of a combustion engine, which may contain entrained non-gaseous components such as liquid droplets, solid particulates, and the like. The exhaust gas stream of a combustion engine typically further comprises combustion products ($CO_2$ and $H_2O$), products of incomplete combustion (carbon monoxide (CO) and hydrocarbons (HC)), oxides of nitrogen ($NO_x$), combustible and/or carbonaceous particulate matter (soot), and un-reacted oxygen and nitrogen.

As used herein, the term "substrate" refers to the monolithic material onto which the catalyst composition is placed.

As used herein, the term "support" refers to any high surface area material, usually a metal oxide material, upon which a catalytic precious metal is applied.

As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated. A washcoat is formed by preparing a slurry containing a certain solid content (e.g., 30%-90% by weight) of particles in a liquid vehicle, which is then coated onto a substrate and dried to provide a washcoat layer.

As used herein, the term "catalyst article" refers to an element that is used to promote a desired reaction. For example, a catalyst article may comprise a washcoat containing catalytic compositions on a substrate.

As used herein, "impregnated" or "impregnation" refers to permeation of the catalytic material into the porous structure of the support material.

Catalyst Composition

The low-temperature $NO_x$ adsorber (LT-NA) composition of the invention comprises an active metal impregnated onto a metal oxide support, wherein the active metal is predominately ruthenium. As used therein "predominantly" ruthenium refers to an amount of ruthenium of at least 50% by weight based on the total amount of active metal present. As used herein, "active metal" refers to platinum group metals or oxides thereof, including platinum (Pt), palladium (Pd), ruthenium (Ru), rhodium (Rh), osmium (Os), iridium (Ir), and mixtures thereof. The concentration of active metal ruthenium can vary, but will typically be from about 0.01 wt % to about 5 wt % relative to the total weight of the impregnated metal oxide support. In some embodiments, the $NO_x$ adsorber composition is substantially free of any further active metal. As used herein, the term "substantially free of additional active metal" means that there is no additional active metal intentionally added to the $NO_x$ adsorber composition, and that there is less than about 0.01 wt % of an additional active metal by weight present in the $NO_x$ adsorber composition.

In other embodiments, the $NO_x$ adsorber composition contains another active metal, such as in a weight ratio of about 1:10 to about 10:1, more typically in a weight ratio of ruthenium to other active metal equal to or greater than about 1:1, equal to or greater than about 2:1, or equal to or greater than about 5:1. In each instance, in some embodiments, the listed ratio may have an upper limit of a ratio of 10:1.

As used herein, "metal oxide support" refers to metal-containing oxide materials exhibiting chemical and physical stability at high temperatures, such as the temperatures associated with diesel engine exhaust. In some embodiments, the metal oxide support comprises greater than 50% by weight ceria based on the total weight of the $NO_x$ adsorber composition. In further embodiments, the metal oxide support comprises greater than about 60%, or greater than about 70%, or greater than about 80%, or greater than about 90% by weight ceria based on the total weight of the $NO_x$ adsorber composition. In additional embodiments, the metal oxide support comprises from about 50% to about 99.9%, or from about 70% to about 99.5%, or from about 80% to about 99.0% by weight ceria based on the total weight of the $NO_x$ adsorber composition. In additional embodiments, the metal oxide support comprises 100.0% by weight ceria based on the total weight of the $NO_x$ adsorber composition.

In some embodiments, additional metal oxides can be combined as physical mixtures or chemical combinations with ceria to form the metal oxide support. Examples of additional metal oxides include alumina, silica, zirconia, titania, or a combination thereof. In some embodiments, additional metal oxides include rare earth metal oxides, e.g., Y, La, Pr, Nd, Pm, Sm, Eu, Gd, Tb, Dy, Ho, Er, Tm, Yb, Lu, or a combination thereof. In some embodiments, the additional metal oxide is selected from $Pr_6O_{11}$, $ZrO_2$, $Gd_2O_3$, and combinations thereof. In some embodiments, the total amount of the additional metal oxide ranges from about 0.1% to about 10%, preferably from about 1% to about 5%, by weight based on the total weight of the $NO_x$ adsorber composition (or less than 10%, or less than 9%, or less than 8%, or less than 7%, or less than 6%, or less than 5%, or less than 4%, or less than 3%, or less than 2%, or less than 1%, or less than 0.5% by weight based on the total weight of the $NO_x$ adsorber composition).

In some embodiments, the metal oxide support comprises atomically-doped combinations of metal oxides. For example, in some embodiments, the metal oxide support comprises atomically-doped combinations of metal oxides containing a dopant metal selected from Si, Nb, Zr, and combinations thereof.

In some embodiments, atomically-doped combinations of metal oxides comprise at least one rare earth metal oxide or a combination thereof. For example, in some embodiments, the at least one rare earth metal oxide is modified to contain a dopant metal in oxide form, the dopant metal being selected from Y, La, Pr, Nd, Pm, Sm, Eu, Gd, Tb, Dy, Ho, Er, Tm, Yb, Lu and combinations thereof. In some embodiments, the dopant metal is Pr, Gd, Zr, or a combination thereof. In some embodiments, the total amount of the dopant metal ranges from about 0.1% to about 10%, preferably from about 1% to about 5% by weight based on the total weight of the $NO_x$ adsorber composition (less than 10%, less than 9%, less than 8%, less than 7%, less than 6%, less than 5%, less than 4%, less than 3%, less than 2%, less than 1%, or less than 0.5% by weight based on the total weight of the $NO_x$ adsorber composition).

In other embodiment the $NO_x$ adsorber composition is substantially free of zirconium. In some embodiments, the catalyst composition is substantially free of barium or zeolite. As used herein, the term "substantially free of zirconium" or "substantially free of barium or zeolite" means that there is no zirconium or barium or zeolite intentionally added to the $NO_x$ adsorber composition, and that there is less than about 5% of zirconium or barium or zeolite by weight in the $NO_x$ adsorber composition. As such, in specific embodiments, there is less than about 5% by weight, less than about 4%, less than about 3%, less than about 2%, or less than about 1% by weight of zirconium or barium or zeolite present in the $NO_x$ adsorber composition.

In some embodiments, the $NO_x$ adsorber composition comprises a surface concentration of Ru ions of at least 0.5% by weight based on the total weight of the $NO_x$ adsorber composition, as measured by x-ray photoelectron spectroscopy (XPS). Without intending to be bound by theory, it is thought that the concentration of active Ru ions (e.g., ions having an oxidation state of Ru (+IV), Ru (+VI) or any oxidation state in between) can be correlated to the extent of catalytic activity provided by Ru metal. For example, the same amount of Ru can be impregnated onto various metal oxides supports comprising different active Ru ion concentrations and hence $NO_x$ adsorbing efficiencies. For example, XPS measurements have shown that metal oxide supports, in terms of their active Ru species surface concentration can be ranked as follows: $CeO_2 > ZrO_2 > CeO_2\text{-}ZrO_2\text{-}Y_2O_3\text{-}La_2O_3 > Al_2O_3 > TiO_2$, wherein the Ru concentration is 2% by weight based on the total weight of the NOx adsorber composition. Likewise, measurements have shown that $NO_x$ adsorbing efficiencies can be ranked as follows: $CeO_2 > ZrO_2 > CeO_2\text{-}ZrO_2\text{-}Y_2O_3\text{-}La_2O_3 > Al_2O_3 > TiO_2$. Since both rankings are essentially identical, active Ru ion surface concentration may be used as a reasonable guide to determine relative $NO_x$ adsorbing efficiencies of the catalytic composition.

Substrate Carrier

According to one or more embodiments, the substrate carrier for the composition of a low-temperature $NO_x$ adsorber may be constructed of any material typically used for preparing automotive catalysts and will typically comprise a metal or ceramic honeycomb structure. The substrate typically provides a plurality of wall surfaces upon which the washcoat composition is applied and adhered, thereby acting as a substrate carrier for the catalyst composition.

Exemplary metallic substrate carriers include heat resistant metals and metal alloys, such as titanium and stainless steel as well as other alloys in which iron is a substantial or major component. Such alloys may contain one or more of nickel, chromium, and/or aluminum, and the total amount of these metals may advantageously comprise at least 15 wt % of the alloy, e.g., 10-25 wt % of chromium, 3-8 wt % of aluminum, and up to 20 wt % of nickel. The alloys may also contain small or trace amounts of one or more other metals, such as manganese, copper, vanadium, titanium and the like. The surface of the metal substrate carriers may be oxidized at high temperatures, e.g., 1000° C. and higher, to form an oxide layer on the surface of the substrate carrier, improving the corrosion resistance of the alloy and facilitating adhesion of the washcoat layer to the metal surface.

Ceramic materials used to construct the substrate carrier may include any suitable refractory material, e.g., cordierite, mullite, cordierite-α alumina, silicon nitride, zircon mullite, spodumene, alumina-silica magnesia, zircon silicate, sillimanite, magnesium silicates, zircon, petalite, α alumina, aluminosilicates and the like.

Any suitable substrate design may be employed, such as a monolithic flow-through substrate having a plurality of fine, parallel gas flow passages extending from an inlet to an outlet face of the substrate such that passages are open to fluid flow. The passages, which are essentially straight paths from the inlet to the outlet, are defined by walls on which the catalytic material is coated as a washcoat so that the gases flowing through the passages contact the catalytic material. The flow passages of the monolithic substrate are thin-walled channels which can be of any suitable cross-sectional shape, such as trapezoidal, rectangular, square, sinusoidal, hexagonal, oval, circular, and the like. Such structures may contain from about 60 to about 1200 or more gas inlet openings (i.e., "cells") per square inch of cross section (cpsi), more usually from about 300 to 600 cpsi. The wall thickness of flow-through substrates can vary, with a typical range being between 0.002 and 0.1 inches. A representative commercially-available flow-through substrate is a cordierite substrate having 400 cpsi and a wall thickness of 6 mil, or 600 cpsi and a wall thickness of 4 mil. However, it will be understood that the invention is not limited to a particular substrate type, material, or geometry.

In alternative embodiments, the substrate carrier may be a wall-flow substrate, wherein each passage is blocked at one end of the substrate body with a non-porous plug, with alternate passages blocked at opposite end-faces. This requires that gas flow through the porous walls of the wall-flow substrate to reach the exit. Such monolithic substrates may contain up to about 700 or more cpsi, such as about 100 to 400 cpsi and more typically about 200 to about 300 cpsi. The cross-sectional shape of the cells can vary as described above. Wall-flow substrates typically have a wall thickness between 0.002 and 0.1 inches. A representative commercially available wall-flow substrate is constructed from a porous cordierite, an example of which has 200 cpsi and 10 mil wall thickness or 300 cpsi with 8 mil wall thickness, and wall porosity between 45-65%. Other ceramic materials such as aluminum-titanate, silicon carbide and silicon nitride are also used in wall-flow filter substrates. However, it will be understood that the invention is not limited to a particular substrate type, material, or geometry. Note that where the substrate carrier is a wall-flow substrate, the $NO_x$ adsorber composition can permeate into the pore structure of the porous walls (i.e., partially or fully occluding the pore openings) in addition to being disposed on the surface of the walls.

Figure 2:
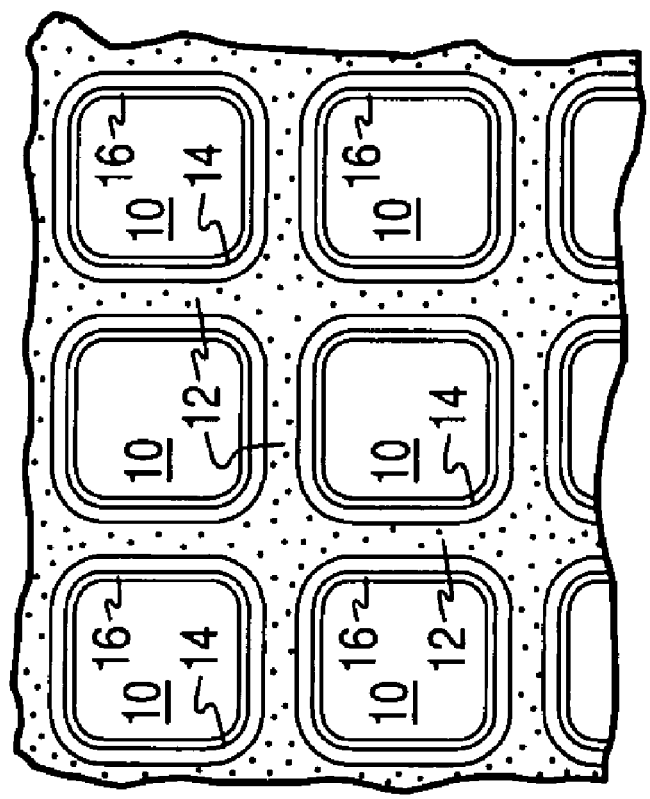
FIG. 2 is a partial cross-sectional view enlarged relative to FIG. 1 and taken along a plane parallel to the end faces of the substrate carrier of FIG. 1, which shows an enlarged view of a plurality of the gas flow passages shown in FIG. 1, in an embodiment wherein the substrate carrier is a monolithic flow-through substrate.

FIGS. 1 and 2 illustrate an exemplary substrate 2 in the form of a flow-through substrate coated with a washcoat composition as described herein. Referring to FIG. 1, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 2, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 2, walls 12 are so dimensioned and configured that gas flow passages 10 have a substantially regular polygonal shape. As shown, the washcoat composition can be applied in multiple, distinct layers if desired. In the illustrated embodiment, the washcoat consists of both a discrete bottom washcoat layer 14 adhered to the walls 12 of the carrier member and a second discrete top washcoat layer 16 coated over the bottom washcoat layer 14. The present invention can be practiced with one or more (e.g., 2, 3, or 4) washcoat layers and is not limited to the illustrated two-layer embodiment.

Figure 3:
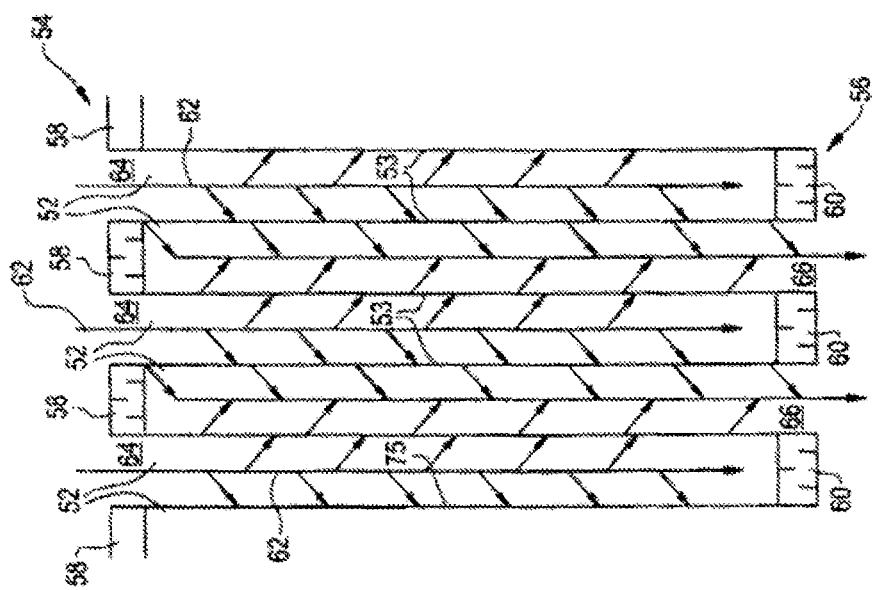
FIG. 3 is a cutaway view of a section enlarged relative to FIG. 1, wherein the honeycomb-type substrate carrier in FIG. 1 represents a wall flow filter substrate monolith.

Alternatively, FIGS. 1 and 3 can illustrate an exemplary substrate 2 in the form a wall flow filter substrate coated with a washcoat composition as described herein. As seen in FIG. 3, the exemplary substrate 2 has a plurality of passages 52. The passages are tubularly enclosed by the internal walls 53 of the filter substrate. The substrate has an inlet end 54 and an outlet end 56. Alternate passages are plugged at the inlet end with inlet plugs 58, and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58. The porous wall flow filter used in this invention is catalyzed in that the wall of said element has thereon or contained therein one or more catalytic materials. Catalytic materials may be present on the inlet side of the element wall alone, the outlet side alone, both the inlet and outlet sides, or the wall itself may consist all, or in part, of the catalytic material. This invention includes the use of one or more layers of catalytic material on the inlet and/or outlet walls of the element.

some embodiments, each catalyst composition of the current invention is supported on their own individual substrate carrier. For example, in some embodiments, catalyst compositions such as low-temperature $NO_x$ adsorber composition, SCR composition, DOC composition, catalytic soot filter (CSF), SCR/soot filter component (SCRoF) can all be supported on their own individual substrate carrier. Each substrate carrier may be the same or different.

Figure 6A:
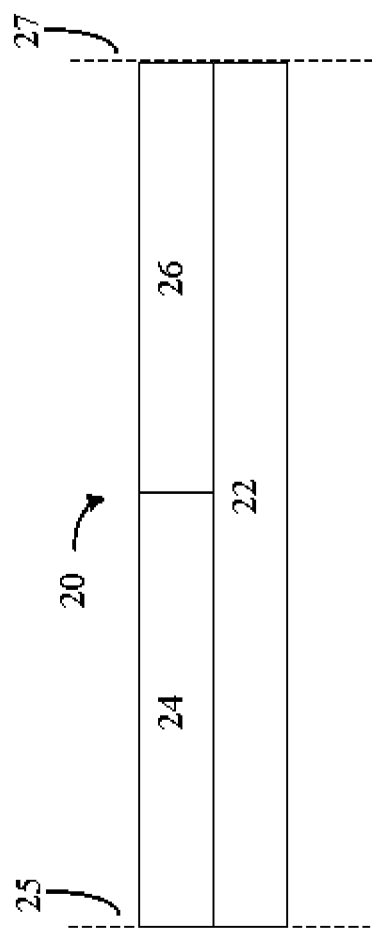
FIG. 6A shows a cross-sectional view of a zoned $NO_x$ adsorber composition of the present invention.

In some embodiments, however the same substrate carrier may be used for multiple catalyst compositions of the invention. For example, the substrate carrier can be coated with at least two catalyst compositions contained in a separate washcoat slurries in an axially zoned configuration. For example, the same substrate carrier is coated with washcoat slurry of one catalyst composition and a washcoat slurry of another catalyst composition, wherein each catalyst composition is different. This may be more easily understood by reference to FIG. 6A, which shows an embodiment in which the first washcoat zone 24 and the second washcoat zone 26 are located side by side along the length of the substrate carrier 22. The first washcoat zone 24 of specific embodiments extends from the inlet end 25 of the substrate carrier 22 through the range of about 5% to about 95% of the length of the substrate carrier 22. The second washcoat zone 26 extends from the outlet 27 of the substrate carrier 22 from about 5% to about 95% of the total axial length of the substrate carrier 22. The catalyst compositions of at least two components within a treatment system as described in the current invention can be zoned onto the same substrate carrier. In some embodiments, the catalyst composition of a low-temperature $NO_x$ adsorber and an SCR component are zoned onto the same substrate carrier. For example referring back to FIG. 6A, the first washcoat zone 24 represents the catalyst composition of the low-temperature $NO_x$ adsorber and extends from the inlet end 25 of the substrate carrier through the range of about 5% to about 95% of the length of the substrate carrier 22. Hence, the second washcoat zone 26 comprising the SCR component is located side by side to zone 24 extending from the outlet 27 of the substrate carrier 22. In one embodiment, the first washcoat zone 24 can represent the SCR component and the second washcoat zone 26 con comprise the low-temperature $NO_x$ adsorber composition.

In other embodiments, the catalyst composition of a DOC and a low-temperature $NO_x$ adsorber are zoned onto the same substrate carrier. For example referring back to FIG. 6A, the first washcoat zone 24 represents the catalyst composition of the low-temperature $NO_x$ adsorber and extends from the inlet end 25 of the substrate carrier through the range of about 5% to about 95% of the length of the substrate carrier 22. Hence, the second washcoat zone 26 comprising the DOC component is located side by side to zone 24 extending from the outlet 27 of the substrate carrier 22. In one embodiment, the first washcoat zone 24 can represent the DOC component and the second washcoat zone 26 con comprise the low-temperature $NO_x$ adsorber composition.

In other embodiments, the catalyst composition of a soot filter and a low-temperature $NO_x$ adsorber are zoned onto the same substrate carrier. For example referring back to FIG. 6A, the first washcoat zone 24 represents the catalyst composition of the low-temperature $NO_x$ adsorber and extends from the inlet end 25 of the substrate carrier through the range of about 5% to about 95% of the length of the substrate carrier 22. Hence, the second washcoat zone 26 comprising the soot filter component is located side by side to zone 24 extending from the outlet 27 of the substrate carrier 22. In one embodiment, the first washcoat zone 24 can represent the soot filter component and the second washcoat zone 26 con comprise the low-temperature $NO_x$ adsorber composition.

In other embodiments, the catalyst composition of a soot filter and a low-temperature $NO_x$ adsorber are zoned onto the same substrate carrier. For example referring back to FIG. 6A, the first washcoat zone 24 represents the catalyst composition of the low-temperature $NO_x$ adsorber and extends from the inlet end 25 of the substrate carrier through the range of about 5% to about 95% of the length of the substrate carrier 22. Hence, the second washcoat zone 26 comprising the soot filter/SCR component is located side by side to zone 24 extending from the outlet 27 of the substrate carrier 22. In one embodiment, the first washcoat zone 24 can represent the soot filter/SCR component and the second washcoat zone 26 con comprise the low-temperature $NO_x$ adsorber composition. In additional embodiments, the same substrate carrier is zoned using three different catalyst compositions.

Figure 6B:
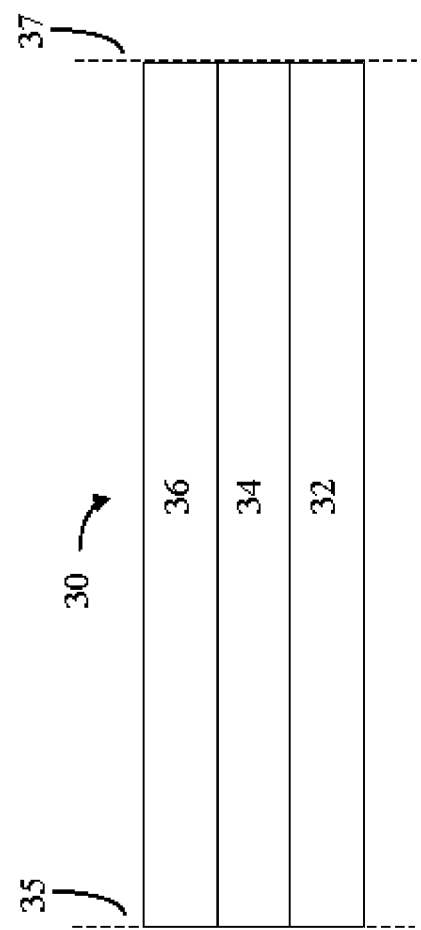
FIG. 6B shows a cross-sectional view of a layered $NO_x$ adsorber composition of the present invention.

In some embodiments, however the same substrate carrier is layered with at least two catalyst compositions contained in separate washcoat slurries in a horizontal configuration. For example, the same substrate carrier is coated with washcoat slurry of one catalyst composition and a washcoat slurry of another catalyst composition, wherein each catalyst composition is different. This may be more easily understood by reference to FIG. 6B, which shows an embodiment in which the first washcoat zone 34 is deposited on substrate carrier 32 and the second washcoat zone 36 is layered on top of the first washcoat zone 36 to render the coated substrate carrier 30. The first washcoat zone 34 and the second washcoat zone 36 are deposited over the entire length of the substrate carrier 32, i.e., from inlet 35 to outlet 37. For example referring back to FIG. 6B, the first washcoat zone 34 represents a DOC composition coating substrate carrier 32, while the second washcoat zone 36 represents the catalyst composition of the low-temperature $NO_x$ adsorber and is layered on top of the first washcoat zone 34, wherein both washcoat zones extend from inlet 35 to outlet 37. In one embodiment, the first washcoat zone 34 can represent the composition of the low-temperature $NO_x$ adsorber, while the DOC composition in the second washcoat zone 36 is layered on top of the first washcoat zone 34.

In some embodiments, referring back to FIG. 6B, the first washcoat zone 34 represents a SCR composition coating substrate carrier 32, while the second washcoat zone 36 represents the catalyst composition of the low-temperature $NO_x$ adsorber and is layered on top of the first washcoat zone 34, wherein washcoat both zones extend from inlet 35 to outlet 37. In one embodiment, the first washcoat zone 34 can represent the composition of the low-temperature $NO_x$ adsorber, while the SCR composition in the second washcoat zone 36 is layered on top of the first washcoat zone 34.

In some embodiments, referring back to FIG. 6B, the first washcoat zone 34 represents a soot filter composition coating substrate carrier 32, while the second washcoat zone 36 represents the catalyst composition of the low-temperature $NO_x$ adsorber and is layered on top of the first washcoat zone 34, wherein washcoat both zones extend from inlet 35 to outlet 37. In one embodiment, the first washcoat zone 34 can represent the composition of the low-temperature $NO_x$ adsorber, while the soot filter composition in the second washcoat zone 36 is layered on top of the first washcoat zone 34.

In some embodiments, referring back to FIG. 6B, the first washcoat zone 34 represents a soot filter/SCR composition coating substrate carrier 32, while the second washcoat zone 36 represents the catalyst composition of the low-temperature $NO_x$ adsorber and is layered on top of the first washcoat zone 34, wherein washcoat both zones extend from inlet 35 to outlet 37. In one embodiment, the first washcoat zone 34 can represent the composition of the low-temperature $NO_x$ adsorber, while the soot filter/SCR composition in the second washcoat zone 36 is layered on top of the first washcoat zone 34.

In describing the quantity of washcoat or catalytic metal components or other components of the composition, it is convenient to use units of weight of component per unit volume of catalyst substrate. Therefore, the units, grams per cubic inch ("g/in$^3$") and grams per cubic foot ("g/ft$^3$") are used herein to mean the weight of a component per volume of the substrate, including the volume of void spaces of the substrate. Other units of weight per volume such as g/L are also sometimes used. The total loading of the catalyst composition on the substrate carrier, such as a monolithic flow-through substrate, is typically from about 0.1 to about 6 g/in$^3$, and more typically from about 0.5 to about 4 g/in$^3$. Total loading of the active metal without support material (i.e., Ruthenium) is typically in the range of about 10 to about 200 g/ft$^3$ for each individual catalyst substrate.

It is noted that these weights per unit volume are typically calculated by weighing the catalyst substrate before and after treatment with the catalyst washcoat composition, and since the treatment process involves drying and calcining the catalyst substrate at high temperature, these weights represent an essentially solvent-free catalyst coating since all of the water of the washcoat slurry has been removed.

Method of Making the Catalyst Composition

Preparation of the active metal-impregnated metal oxide support typically comprises impregnating the metal oxide support in particulate form with an active metal solution, such as a ruthenium precursor solution. The active metal can be impregnated into the same support particles or separate support particles using an incipient wetness technique.

Incipient wetness impregnation techniques, also called capillary impregnation or dry impregnation are commonly used for the synthesis of heterogeneous materials, i.e., catalysts. Typically, a metal precursor is dissolved in an aqueous or organic solution and then the metal-containing solution is added to a catalyst support containing the same pore volume as the volume of the solution that was added. Capillary action draws the solution into the pores of the support. Solution added in excess of the support pore volume causes the solution transport to change from a capillary action process to a diffusion process, which is much slower. The catalyst can then be dried and calcined to remove the volatile components within the solution, depositing the metal on the surface of the catalyst support. The maximum loading is limited by the solubility of the precursor in the solution. The concentration profile of the impregnated material depends on the mass transfer conditions within the pores during impregnation and drying.

The support particles are typically dry enough to absorb substantially all of the solution to form a moist solid. Aqueous solutions of water soluble compounds or complexes of the active metal are typically utilized, such as ruthenium chloride, ruthenium nitrate (e.g., Ru (NO) and salts thereof) hexaammine ruthenium chloride, or combinations thereof. Following treatment of the support particles with the active metal solution, the particles are dried, such as by heat treating the particles at elevated temperature (e.g., 100-150° C.) for a period of time (e.g., 1-3 hours), and then calcined to convert the active metal to a more catalytically active form. An exemplary calcination process involves heat treatment in air at a temperature of about 400-550° C. for 10 min to 3 hours. The above process can be repeated as needed to reach the desired level of active metal impregnation.

In some embodiments, the metal oxide support is modified to contain a dopant metal in oxide form. The dopant metal can be selected from Y, La, Pr, Nd, Pm, Sm, Eu, Gd, Tb, Dy, Ho, Er, Tm, Yb, Lu, Si, Nb, Zr and combinations thereof. In some embodiments, the dopant metal is Si, Pr, Gd, Zr, or a combination thereof. In some embodiments, the metal oxide support is modified with the dopant metal to yield a modified oxide support material prior to impregnation with the active metal. For example, the metal oxide support is combined with a solution of dopant metal salt (e.g., nitrate) to allow impregnation of the dopant metal onto the metal oxide support using incipient wetness techniques. This modified metal oxide support can then be dried and subsequently calcined. For example, in some embodiments such dopant metal modified metal oxide is dried at 110° C. for 2 hours and then calcined at 500° C. for 2 hours. The resulting activated modified metal oxide can then be impregnated with another active metal according to the same methodology as described above to achieve a desirable active metal loading. The resulting material(s) can be stored as a dry powder.

Substrate Coating Process

The above-noted catalyst composition(s), in the form of carrier particles containing an active metal-impregnated metal oxide support therein, is mixed with water to form a slurry for purposes of coating a catalyst substrate carrier, such as a honeycomb-type substrate.

In addition to the catalyst particles, the slurry may optionally contain a binder (e.g., alumina, silica), water-soluble or water-dispersible stabilizers, promoters, associative thickeners, and/or surfactants (including anionic, cationic, non-ionic or amphoteric surfactants). A typical pH range for the slurry is about 3 to about 6. In some embodiments, the stabilizer is substantially free of Barium. In other embodiments, the promoter is substantially free of Lanthanium.

In addition to the catalyst particles, the slurry may optionally contain a binder, associative thickeners, and/or surfactants (including anionic, cationic, non-ionic or amphoteric surfactants). The pH of the slurry typically ranges from about 2.5 to about 5. Addition of acidic or basic species to the slurry can be carried out to adjust the pH accordingly. For example, in some embodiments, the pH of the slurry is adjusted by the addition of ammonium hydroxide or aqueous nitric acid.

When present, the binder is typically used in an amount of about 1-5 wt % of the total washcoat loading. The binder can be, for example, bohemite, gamma-alumina, or delta/theta alumina. Alternative the binder can be zirconia-based or silica-based, for example zirconium acetate, zirconia sol or silica sol.

When present, the alumina binder is typically used in an amount of about 0.05 g/in$^3$ to about 1 g/in$^3$.

The slurry can be milled to enhance mixing of the particles and formation of a homogenous material. The milling can be accomplished in a ball mill, continuous mill, or other similar equipment, and the solids content of the slurry may be, e.g., about 20-60 wt %, more particularly about 20-40 wt %. In one embodiment, the post-milling slurry is characterized by a D90 particle size of about 10 to about 40 microns, preferably 10 to about 30 microns, more preferably about 10 to about 15 microns. The D90 is defined as the particle size at which 90% of the particles have a finer particle size.

The slurry is then coated on the catalyst substrate using any washcoat technique known in the art. In one embodiment, the catalyst substrate is dipped one or more times in the slurry or otherwise coated with the slurry. Thereafter, the coated substrate is dried at an elevated temperature (e.g., 100-150° C.) for a period of time (e.g., 10 min-3 hours) and then calcined by heating, e.g., at 400-600° C., typically for about 10 minutes to about 3 hours. Following drying and calcining, the final washcoat coating layer can be viewed as essentially solvent-free.

After calcining, the catalyst loading obtained by the above described washcoat technique can be determined through calculation of the difference in coated and uncoated weights of the substrate. As will be apparent to those of skill in the art, the catalyst loading can be modified by altering the slurry rheology. In addition, the coating/drying/calcining process to generate a washcoat can be repeated as needed to build the coating to the desired loading level or thickness, meaning more than one washcoat may be applied.

The catalyst composition can be applied as a single layer or in multiple layers. In one embodiment, the catalyst is applied in a single layer (e.g., only layer 16 or only layer 14 of FIG. 2). In one embodiment, the catalyst composition is applied in multiple layers with each layer having a different composition, for example a low-temperature $NO_x$ adsorption layer and a DOC layer. In another embodiment, the catalyst composition can comprise one single layer. The relative amount of the $NO_x$ adsorber composition in each layer can vary, with an exemplary dual layer coating comprising about 10-90% by weight of the total weight of $NO_x$ adsorber composition in the bottom layer (adjacent to the substrate surface) and about 10-90% by weight of the total weight of the $NO_x$ adsorber composition in the top layer respectively.

Method of Trapping and Releasing $NO_x$

In a traditional lean $NO_x$ trap (LNT) system the $NO_x$ adsorber contains a basic sorbent component (e.g., $CeO_2$ or BaO) for $NO_x$ storage and a platinum group metal for catalytic NO oxidation (e.g., Pt) and reduction (e.g., Rh). The traditional LNT catalyst operates under cyclic lean (trapping mode) and rich (regeneration mode) exhaust conditions during which the engine out NO is converted to $N_2$ as shown in equations 1-6:

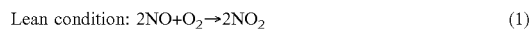

Lean condition: $2NO+O_2 \rightarrow 2NO_2$ (1)

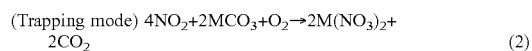

(Trapping mode) $4NO_2+2MCO_3+O_2 \rightarrow 2M(NO_3)_2+2CO_2$ (2)

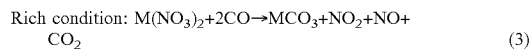

Rich condition: $M(NO_3)_2+2CO \rightarrow MCO_3+NO_2+NO+CO_2$ (3)

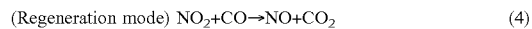

(Regeneration mode) $NO_2+CO \rightarrow NO+CO_2$ (4)

$2NO+2CO \rightarrow N_2+2CO_2$ (5)

$2NO+2H_2 \rightarrow N_2+2H_2O$ (6)

For example, ceria or baria can be used in LNT applications for the purpose of adsorbing NOx from the engine exhaust. However, during startup of the vehicle when the catalyst is cold the oxidation catalyst is not active for oxidation of NO to $NO_2$ and therefore the $NO_x$ adsorber is unable to store $NO_x$ (cold start). Only when the temperature of the exhaust increases to the point when the platinum group metal, in the catalyst becomes active for NO oxidation can $NO_x$ be stored. After a later time, when the catalyst is hot, a transient rich condition is introduced by engine management and $NO_x$ is released from the adsorber, and is subsequently converted into $N_2$.

The low-temperature $NO_x$ adsorber (LT-NA) of the invention is able to adsorb NO, $NO_2$, and mixtures thereof, whereas conventional LNT typically only adsorb $NO_2$. Here, the low-temperature $NO_x$ adsorber can adsorb $NO_x$ in the temperature range between 50-200° C. Then when the low temperature $NO_x$ adsorber is in the range of 200-300° C. and the downstream SCR catalyst has attained a temperature sufficient for urea injection (180° C.) the low-temperature $NO_x$ adsorber releases NO back into the exhaust, where it can be converted to $N_2$ across a downstream SCR catalyst. In some embodiments, the low temperature $NO_x$ adsorber is also used in lean $NO_x$ trap compositions.

Some aspects of the current invention are drawn to a method for adsorbing $NO_x$ (NO, $NO_2$, or mixtures thereof)

in an exhaust gas stream. Such methods can comprise contacting the gas stream with a low temperature $NO_x$ adsorber composition as described herein for a time and temperature sufficient to reduce the level of $NO_x$, in the exhaust gas stream.

In some embodiments, the amount of NO adsorbed from the exhaust gas stream is about 15% to about 99.9%, preferably from about 30% to about 99.9% by weight based on the total amount of NO present in the exhaust gas stream. The amount of NO adsorbed can be, in some embodiments, at least 15%, 25%, 35%, 45%, 55%, 65%, 75%, 85%, or 95% by weight based on the total amount of NO present in the exhaust gas stream, with each value being understood to have an upper boundary of 100%.

In some embodiments, the temperature range for adsorbing NO using the low temperature NOx adsorber as described in the present embodiments, ranges from about 50° C. to about 200° C.

In some embodiments, the amount of $NO_x$ (i.e., a mixture of NO and $NO_2$) adsorbed from the exhaust gas stream is about 15% to about 99.9%, preferably from about 30% to about 99.9% by weight based on the total amount of $NO_x$ present in the exhaust gas stream. The amount of $NO_x$ adsorbed can be, in some embodiments at least 15%, 25%, 35%, 45%, 55%, 65%, 75%, 85%, or 95% by weight based on the total amount of $NO_x$ present in the exhaust gas stream, with each value being understood to have an upper boundary of 100.

In some embodiments, at least 90%, or at least 80% of NO that is adsorbed onto the low temperature $NO_x$ adsorber is adsorbed during the first 60 seconds during cold start having a temperature below 100° C.

In some embodiments, the temperature required for adsorbing a mixture of NO and $NO_2$ using a low temperature $NO_x$ adsorber as described in the present embodiments ranges from about 50° C. to about 200° C.

In some embodiments, the $NO_x$ adsorption capacity of the low-temperature NOx adsorber compositions of the current invention ranges from about 0.5 to about 1.0 g/L, preferably greater than 0.75 g/L, during the entire WHTC cycle.

Another aspect of the current invention is directed towards a method for releasing $NO_x$ (i.e., a mixture of NO and $NO_2$) from a low temperature $NO_x$ adsorber back into the exhaust gas stream at a temperature sufficient for any additional downstream catalyst present in the exhaust gas treatment system to convert NO to $N_2$.

In some embodiments, the amount of NO released back into the exhaust gas stream is at least about 55% to about 100%, preferably at least about 75% to about 100% (or at least about 55%, or at least about 65%, or at least about 75%, or at least about 85%, or at least about 95%, or at least about 99.9%) by weight based on the total amount of NO adsorbed onto the $NO_x$ adsorber, wherein the temperature for release of NO from the low temperature $NO_x$ adsorber ranges from about 170° C. to about 300° C., preferably about 250° C. to about 350° C.

In some embodiments, the amount of $NO_x$ (i.e., a mixture of NO and $NO_2$) released back into the exhaust gas stream is at least about 55% to about 100%, preferably at least about 75% to about 100% (or at least about 55%, or at least about 65%, or at least about 75%, or at least about 85%, or at least about 95%, or at least about 99.9%) by weight based on the total amount of $NO_x$ adsorbed onto the $NO_x$ adsorber, wherein the temperature for release of $NO_x$ from the low temperature $NO_x$ adsorber ranges from about 170° C. to about 300° C., preferably about 250° C. to about 350° C.

In some embodiments, the temperature for release of NO from the low temperature $NO_x$ adsorber is dependent upon the ruthenium concentration present in the low temperature $NO_x$ adsorber composition. In general, the higher the ruthenium concentration present in the $NO_x$ adsorber composition the higher will be the NO release temperature.

Another aspect of the current invention is directed towards the conversion of released NO to $NO_2$ in the presence of the low-temperature $NO_x$ adsorber composition at a temperature of at least 300° C. For example, in some embodiments, the low temperature $NO_x$ adsorber composition is effective to oxidize NO present in the exhaust gas steam to $NO_2$ at a temperature ranging from about 300° C. to about 600° C. (or at least 300° C., or at least 350° C., or at least 400° C., or at least 450° C., or at least 500° C., or at least 600° C.). In some embodiments, the amount of NO oxidized to $NO_2$ in the presence of the low temperature $NO_x$ adsorber is about 15% to about 70%.

Emission Treatment System

The emission gas treatment system of the present invention comprises one or more components for the treatment of exhaust gas emissions from a diesel engine or a lean burn gasoline engine such as a diesel oxidation catalyst (DOC), a low-temperature $NO_x$ adsorber (LT-NA), and/or a selective catalytic reduction (SCR) catalyst. The emission treatment system may also further comprise a soot filter component and/or additional catalyst components, although the relative placement of the various components of the emission treatment system can be varied.

The diesel oxidation catalyst (DOC) component of the exhaust gas treatment system of the present invention may be located, for example, upstream of the SCR component and/or soot filter. A suitable DOC catalyst component for use in the emission treatment system is able to effectively catalyze the oxidation of CO and HC to carbon dioxide ($CO_2$). Preferably, the oxidation catalyst is capable of converting at least 50% of the CO or HC component present in the exhaust gas.

In addition to treating the exhaust gas emissions via use of a diesel oxidation component may employ a soot filter for removal of particulate matter. The soot filter may be located upstream or downstream from the DOC, but typically, the soot filter will be located downstream from the DOC. In one embodiment, the soot filter is a catalyzed soot filter (CSF). The CSF may comprise a substrate coated with washcoat particles containing one or more catalysts for burning trapped soot and or oxidizing exhaust gas stream emissions. In general, the soot burning catalyst can be any known catalyst for combustion of soot. For example, the CSF can be coated with one or more high surface area refractory oxides (e.g., an aluminum oxide or ceria-zirconia) for the combustion of CO and unburned hydrocarbons and to some degree particulate matter. The soot burning catalyst can be an oxidation catalyst comprising one or more precious metal catalysts (e.g., platinum and/or palladium).

The exhaust gas treatment system of the present invention must further comprise a selective catalytic reduction (SCR) component. The SCR component may be located upstream or downstream of the DOC and/or soot filter. A suitable SCR catalyst component for use in the emission treatment system is able to effectively catalyze the reduction of the $NO_x$ exhaust component at temperatures as high as 650° C. In addition, the SCR must be active for reduction of $NO_x$ even under conditions of low load which typically are associated with lower exhaust temperatures. Preferably, the catalyst article is capable of converting at least 50% of the $NO_x$ (e.g., NO) component to $N_2$, depending on the amount of reductant added to the system. Another desirable attribute for the SCR composition is that it possesses the ability to catalyze the reaction of $O_2$ with any excess $NH_3$ to form $N_2$, so that $NH_3$ is not emitted to the atmosphere. Useful SCR catalyst compositions used in the emission treatment system should also have thermal resistance to temperatures greater than 650° C. Such high temperatures may be encountered during regeneration of the catalyzed soot filter.

Suitable SCR catalyst compositions are described, for instance, in U.S. Pat. Nos. 4,961,917 and 5,516,497, which are both hereby incorporated by reference in their entirety.

Furthermore, the exhaust gas treatment system of the present invention comprises a low-temperature $NO_x$ adsorber as described herein including a metal oxide support impregnated with a PGM component, e.g., $Ru/CeO_2$ catalyst. The low-temperature $NO_x$ adsorber catalyst component adsorbs NO species present in the exhaust gas stream at low temperatures, which may have optionally been treated with at least a DOC and/or CSF component. Preferably, the low-temperature $NO_x$ adsorber is capable of adsorbing greater than 30% of the NO present in the exhaust gas stream. More importantly however, the $NO_x$ adsorber does not release NO species until the exhaust gas stream and/or the exhaust gas emission system has reached a temperature high enough for other catalytic components to be active. Only then can the released NO be converted efficiently to $N_2$ and exit the exhaust gas treatment system. As such the $NO_x$ adsorber has to be located upstream of any catalytic components responsible for the conversion of NO released from the LT-NA.

In addition, the $NO_x$ adsorber does not need to be located in a separate component but can be included in the same component, such as the DOC, CSF, or SCR component, wherein the catalytic compositions for such components is applied to the substrate carrier in a zoned or layered configuration.

Exemplified emission treatment systems may be more readily appreciated by reference to FIGS. 4A-4D and 5A-5F, which depict schematic representations of emission treatment systems in accordance with embodiments of the present invention. Referring to FIG. 4A, and emission treatment system 320 shows an exhaust gas stream containing gaseous pollutants (e.g., unburned hydrocarbons, carbon monoxide and NO) and particulate matter is conveyed via line 322 from an engine 321 to a diesel oxidation catalyst (DOC) 323. In the DOC 323, unburned gaseous and non-volatile hydrocarbons and carbon monoxide are largely combusted to form carbon dioxide and water. The exhaust stream is next conveyed via line 324 to a low-temperature $NO_x$ adsorber (LT-NA 325) for the adsorption and/or storage of NO. The treated exhaust gas stream 326 is next conveyed to a catalyzed soot filter (CSF) 327, which traps particulate matter present within the exhaust gas stream. After removal of particulate matter, via CSF 327, the exhaust gas stream is conveyed via line 328 to a downstream SCR catalyst 329, which provides treatment and/or conversion of NO. The exhaust gas passes through the SCR component 329 at a flow rate which allows sufficient time for the catalyst composition to reduce the level of $NO_x$ (in combination with a reductant) in the exhaust gas at a given temperature in the exhaust gas before exiting the system.

Another embodiment of an emission gas treatment system of the invention is shown in FIG. 4B, which depicts a schematic representation of an emission treatment system 330 also, in accordance with this embodiment of the present invention. Referring to FIG. 4B, an exhaust gas stream is conveyed via line 332 from an engine 331 to a low-temperature $NO_x$ adsorber (LT-NA) 333. Next, the exhaust stream is conveyed via line 334 to a DOC 335 and further conveyed via line 336 to CSF 337. Treated exhaust gas stream 338 is conveyed to SCR 339 before being expelled into the atmosphere.

Another embodiment of an emission gas treatment system of the invention is shown in FIG. 4C, which depicts a schematic representation of an emission treatment system 340 also, in accordance with this embodiment of the present invention. Referring to FIG. 4C, an exhaust gas stream is conveyed via line 342 from an engine 341 to a DOC 343 and further via exhaust gas stream 344 to low-temperature $NO_x$ adsorber (LT-NA) 345. Next, the exhaust stream is conveyed via line 346 to a SCR 347 and further conveyed via line 348 to CSF 349. Treated exhaust gas stream 338 is conveyed to SCR 339 before exiting the system.

Another embodiment of an emission gas treatment system of the invention is shown in FIG. 4D, which depicts a schematic representation of an emission treatment system 350 also, in accordance with this embodiment of the present invention. Referring to FIG. 4D, an exhaust gas stream is conveyed via line 352 from an engine 351 to a to low-temperature $NO_x$ adsorber (LT-NA) 353 and further via gas exhaust line 354 to DOC 355. Exhaust gas line 356 is conveyed to SCR catalyst 357, the exhaust stream 358 is conveyed to CSF 359 before exiting the system.

Figure 5A:
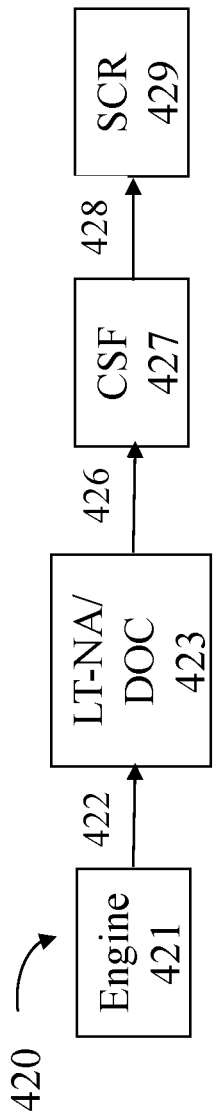
FIG. 5A shows a schematic depiction of an embodiment of an emission treatment system in which a low-temperature $NO_x$ adsorber of the present invention combined with a diesel oxidation catalyst (LT-NA/DOC) is utilized, wherein the LT-NA/DOC is located upstream of a catalyzed soot filter (CSF) and selective catalytic reduction catalyst (SCR)

Another embodiment of an emission gas treatment system of the invention is shown in FIG. 5A, which depicts a schematic representation of an emission treatment system 420 also, in accordance with this embodiment of the present invention. Referring to FIG. 5A, an exhaust gas stream is conveyed via line 422 from an engine 421 to a combination catalyst 423 having a low-temperature $NO_x$ adsorber (LT-NA) and a DOC on the same substrate carrier. Exhaust gas stream 426 is further conveyed to a CSF 427 and further via gas exhaust line 428 to SCR 429 before exiting the system.

Figure 5B:
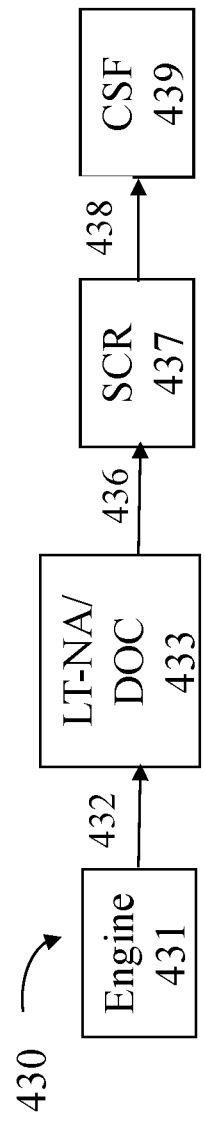
FIG. 5B shows a schematic depiction of an embodiment of an emission treatment system in which a low-temperature $NO_x$ adsorber of the present invention combined with a diesel oxidation catalyst (LT-NA/DOC) is utilized, wherein the LT-NA/DOC is located upstream of a catalyzed soot filter (CSF) and selective catalytic reduction catalyst (SCR)

Another embodiment of an emission gas treatment system of the invention is shown in FIG. 5B, which depicts a schematic representation of an emission treatment system 430 also, in accordance with this embodiment of the present invention. Referring to FIG. 5B, an exhaust gas stream is conveyed via line 432 from an engine 431 to a combination catalyst 433 having a low-temperature $NO_x$ adsorber (LT-NA) and a DOC on the same substrate carrier. Exhaust gas stream 436 is further conveyed to a SCR 437 and further via gas exhaust line 438 to CSF 439 before exiting the system.

Figure 5C:
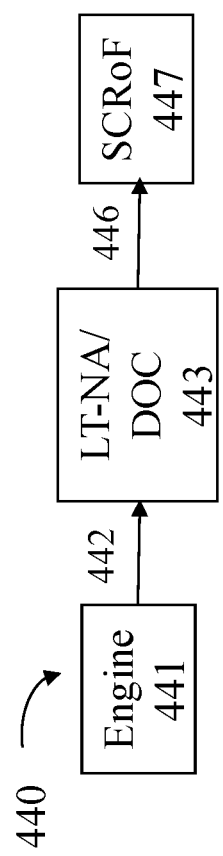
FIG. 5C shows a schematic depiction of an embodiment of an emission treatment system in which a low-temperature $NO_x$ adsorber of the present invention combined with a diesel oxidation catalyst (LT-NA/DOC) is utilized, wherein the LT-NA/DOC is located upstream of a combined selective catalytic reduction catalyst catalyzed soot filter (SCRoF)

Another embodiment of an emission gas treatment system of the invention is shown in FIG. 5C, which depicts a schematic representation of an emission treatment system 440 also, in accordance with this embodiment of the present invention. Referring to FIG. 5C, an exhaust gas stream is conveyed via line 442 from an engine 441 to a combination catalyst 443 having a low-temperature $NO_x$ adsorber (LT-NA) and a DOC on the same substrate carrier. Exhaust gas stream 446 is further conveyed to a combination catalyst SCR and soot filter (SCRoF) 447 before exiting the system.

Figure 5D:
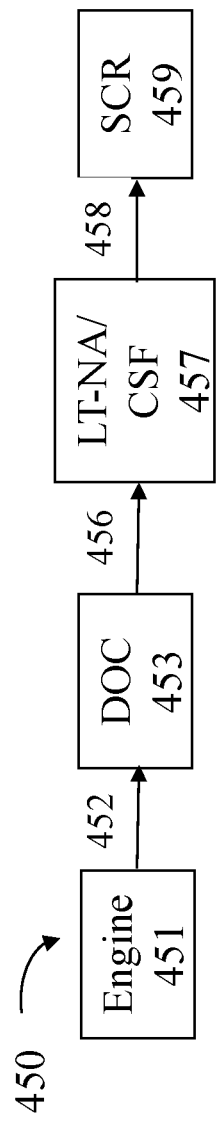
FIG. 5D shows a schematic depiction of an embodiment of an emission treatment system in which a low-temperature $NO_x$ adsorber of the present invention combined with a catalyzed soot filter (LT-NA/CSF) is utilized, wherein the LT-NA/CSF is located upstream of a diesel oxidation catalysts (DOC) and downstream of a selective catalytic reduction catalyst (SCR)

Another embodiment of an emission gas treatment system of the invention is shown in FIG. 5D, which depicts a schematic representation of an emission treatment system 450 also, in accordance with this embodiment of the present invention. Referring to FIG. 5D, an exhaust gas stream is conveyed via line 452 from an engine 451 to a DOC 453 and exhaust gas stream 456 is further conveyed to a to a combination catalyst 457 having a low-temperature $NO_x$ adsorber (LT-NA) and a CSF on the same substrate carrier. Exhaust gas stream 458 is further conveyed to a SCR 459 before exiting the system.

Figure 5E:
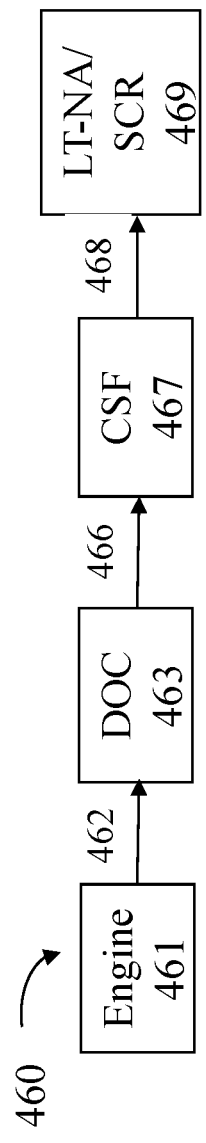
FIG. 5E shows a schematic depiction of an embodiment of an emission treatment system in which a low-temperature $NO_x$ adsorber of the present invention combined with a selective catalytic reduction catalyst (LT-NA/SCR) is utilized, wherein the LT-NA/SCR is located upstream of a catalyzed soot filter (CSF) and a diesel oxidation catalysts (DOC)

Another embodiment of an emission gas treatment system of the invention is shown in FIG. 5E, which depicts a schematic representation of an emission treatment system 461 also, in accordance with this embodiment of the present invention. Referring to FIG. 5E, an exhaust gas stream is conveyed via line 462 from an engine 461 to a DOC 463 and exhaust gas stream 466 is further conveyed to a CSF 467. The resulting exhaust gas stream 468 is further conveyed a combination catalyst 469 having a low-temperature $NO_x$ adsorber (LT-NA) and a SCR on the same substrate carrier before exiting the system.

Figure 5F:
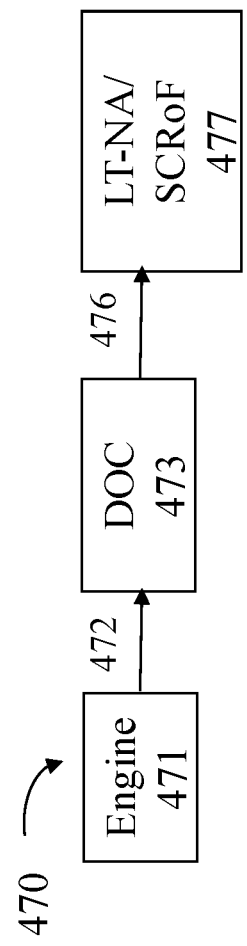
FIG. 5F shows a schematic depiction of an embodiment of an emission treatment system in which a low-temperature $NO_x$ adsorber of the present invention combined with a joint selective catalytic reduction catalyst/catalyzed soot filter (LT-NA/SCRoF) is utilized, wherein the LT-NA/SCROF is located upstream of a diesel oxidation catalysts (DOC)

Another embodiment of an emission gas treatment system of the invention is shown in FIG. 5F, which depicts a schematic representation of an emission treatment system 470 also, in accordance with this embodiment of the present invention. Referring to FIG. 5F, an exhaust gas stream is conveyed via line 472 from an engine 471 to a DOC 473 and exhaust gas stream 476 is further conveyed to a combination catalyst 477 having a low-temperature $NO_x$ adsorber (LT-NA) and a SCRoF on the same substrate carrier before exiting the system.

Any exemplified emission treatment system depicted by FIG. 4A-4D and FIG. 5A-5F may be followed by a selective ammonia oxidation catalyst to remove $NH_3$ released from the SCR and selectively oxidize it to $N_2$.

EXAMPLES

Aspects of the present invention are more fully illustrated by the following examples, which are set forth to illustrate certain aspects of the present invention and are not to be construed as limiting thereof.

Example 1: Preparation of Powder Catalyst Samples

Most powder samples were prepared similarly according to the procedures below: The carrier material ($CeO_2$, $Al_2O_3$, $TiO_2$ etc) was made into a 30% solid slurry with addition of water, and the slurry was milled to particle size 90% less than 15 gm. A portion of the milled carrier slurry was taken, to which a metal precursor solution at appropriate concentration based on desired loading was added. The mixture was dried while stirring, and calcined at 450° C. for 2 hours in air, crushed and sieved to produce a calcined powder with an average particle size of about 500-1000 μm. The calcined powder was aged at 600° C. for 12 hours in 10% steam air.

The following precursors were used:
1. Nitrate precursors of Ru(NO), Pd, Rh, Cu, Ni, Ag, Fe
2. Sn oxalate
3. Ammonium molybdate
4. Pt ammine complex For Ir and Au containing samples, the carrier material was impregnated with chloride precursor solution, dried and calcined at 500° C. for 2 hours in air. The calcined powder was washed with water saturated with $CO_2$ to remove Cl ions. The washed material was made into a 30% solid slurry with addition of water, and the slurry was milled to particle size 90% less than 15 μm, dried while stirring, calcined at 550° C. for 2 hours in air, crushed and sieved to produce a calcined powder with an average particle size of about 500-1000 μm. The calcined powder was aged at 600° C. for 12 hours in 10% steam air.

Example 2: Powder Sample Test Protocol

The adsorption and desorption experiment for powder catalysts was conducted on a flow through reactor. Three grams of each individual powder from Example 1 (500-1000 μm) were employed for testing. The feed gas composition consisted of 250 ppm NO, 50 ppm $NO_2$, 150 ppm CO, 50 ppm $C_3H_6$, 10% $O_2$, 10% $H_2O$ in balanced $N_2$, at flow rate 750 L/h.

In some experiments feed w/o $NO_2$ was used (Table 4): 400 ppm NO, 150 ppm CO, 50 ppm $C_3H_6$, 10% $O_2$, 10% $H_2O$, 5% $CO_2$ in balanced $N_2$.

The reactor was set at 50° C., and the feed gas composition was set via a by-pass line. At the start of reaction, the feed gas was switched from by-pass to reactor, and the temperature was ramped at 20° C./min from 50° C. to 400° C., while $NO_x$ adsorption and desorption was measured. The catalyst was then cooled down in $H_2O$/air to 50° C. and the experiment was repeated a second time as described. The concentrations of NO and $NO_2$ were monitored at the reactor outlet. Data from the $2^{nd}$ run was used for comparison among different catalysts. Unless otherwise stated, $NO_x$ adsorption is described as percentage of $NO_x$ adsorbed from 50° C. to the temperature of release (Table 4).

Figure 7:
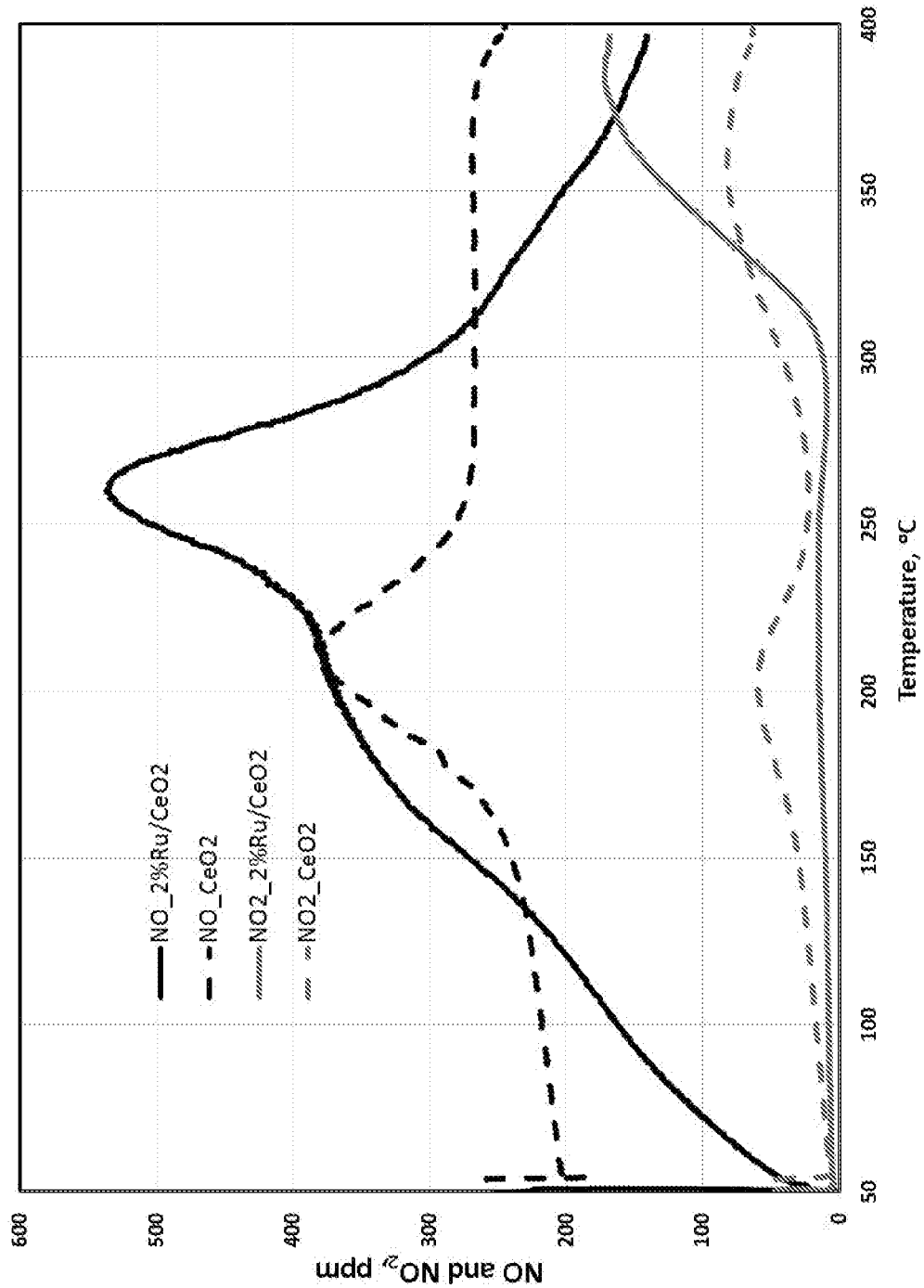
FIG. 7 is a line graph showing catalyst-out NO and $NO_2$ concentration of catalyst compositions containing ceria ($CeO_2$) and ceria containing 2% ruthenium (Ru)

Example 3: Determination of the Effect of Ru On $CeO_2$ for NO and $NO_2$ Adsorption The powder catalyst 2% Ru/$CeO_2$ prepared in Example 1 was compared to pure $CeO_2$ for NO and $NO_2$ adsorption as shown in FIGS. 7. The inlet NO and $NO_2$ concentrations are 250 ppm and 50 ppm respectively. The 2% Ru/$CeO_2$ sample showed nearly 100% NO and $NO_2$ adsorption at the start of the test. Although NO adsorption steadily decreased as the temperature ramped up, there was no $NO_2$ breakthrough until after 300° C. On the other hand, on pure $CeO_2$ only ~25% NO was adsorbed at the beginning of the test. Although $NO_2$ adsorption was much stronger, the first $NO_2$ breakthrough was observed at around 200° C. Desorption started when NO/$NO_2$ concentrations surpassed the inlet concentrations. The 2% Ru/$CeO_2$ sample had two desorption peaks: one shoulder peak at around 200° C. and one intense peak at around 260° C. The lower temperature desorption peak was similar to the single desorption peak observed for pure $CeO_2$. Another unique feature of Ru/$CeO_2$ was that NO to $NO_2$ oxidation was observed at >300° C., as demonstrated by decreasing NO concentration and increasing $NO_2$ concentration. Pure $CeO_2$ does not show any activity for NO oxidation.

Example 4: Comparison Study of Different Carriers for Ru

The effect of different carrier materials for 2% Ru was evaluated, and the results are shown in Table 1. The highest $NO_x$% adsorption was observed for $CeO_2$, the next highest $NO_x$ adsorption was observed on $ZrO_2$ support, which is <40% of that of $CeO_2$. Doped $CeO_2$ material (OSC) with higher hydrothermal stability did not lead to any advantages in $NO_x$ adsorption.

TABLE 1

NOx adsorption efficiency of 2% Ru on different carriers

| Carrier | $CeO_2$ | $ZrO_2$ | $\gamma$-$Al_2O_3$ | $TiO_2$ | OSC* |
|---|---|---|---|---|---|
| $NO_x$% ads. | 46 | 18 | 10 | 1 | 15 |

*OSC: 40-50-5-5% $CeO_2$—$ZrO_2$—$Y_2O_3$—$La_2O_3$

The XPS measurements of the samples in Table 1 show that Ru was found in two different oxidation states, an oxidized form of Ru with a binding energy between those of $Ru^{4+}$ and $Ru^{6+}$, and the Ru metal form. The concentration of different Ru species is listed in Table 2. Comparison of Table 1 and 2 suggests a correlation between the surface concentration of $Ru^{4+}/Ru^{6+}$ and $NO_x$ adsorption efficiency. The highest $NO_x$ adsorption efficiency was observed on the $CeO_2$ support where Ru exclusively existed as $Ru^{4+}/Ru^{6+}$, whereas little $NO_x$ adsorption was observed on the $TiO_2$ support where Ru exclusively existed as metal Ru.

TABLE 2

Surface Ru species concentration measured by XPS (atom percent)

| Carrier | $CeO_2$ | $ZrO_2$ | $\gamma$-$Al_2O_3$ | $TiO_2$ | OSC* |
|---|---|---|---|---|---|
| $Ru^{4+}/Ru^{6+}$ | 0.97 | 0.4 | 0.06 | — | 0.3 |
| $Ru^{\circ}$ | — | 0.1 | 0 | 0.1 | 0.1 |

Figure 8:
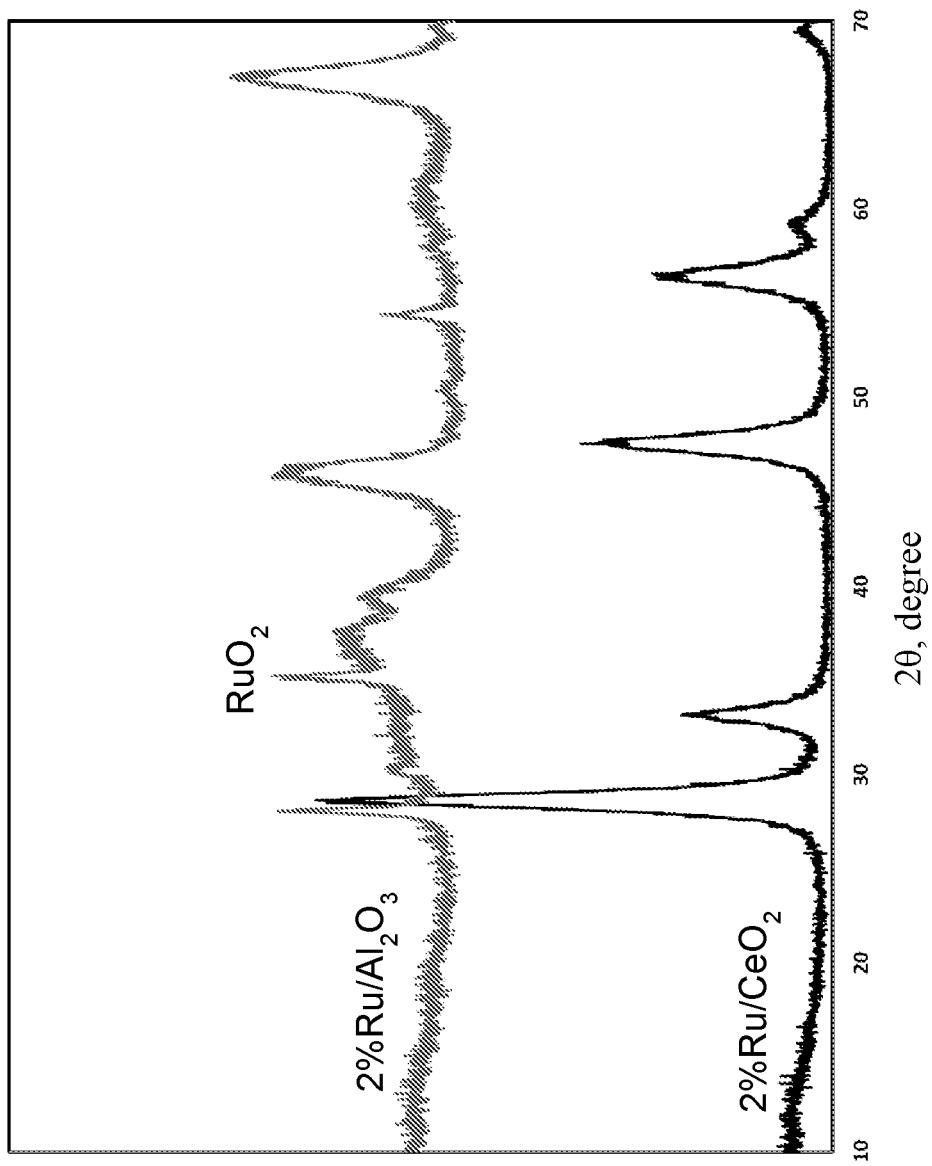
FIG. 8 is a line of graph showing the presence or absence of $RuO_2$ phase present for ruthenium impregnated alumina and ceria supports measured by X-ray diffraction (XRD)

The $Ru^{4+}/Ru^{6+}$ form which was active for low temperature $NO_x$ adsorption was not necessarily equivalent to $RuO_2$ or $RuO_3$. As shown in FIG. 8, a distinct $RuO_2$ phase was observed for 2% $Ru/Al_2O_3$, but not for 2% $Ru/CeO_2$, which suggests that a highly dispersed phase of $Ru^{4+}/Ru^{6+}$ in $CeO_2$ was probably responsible for the $NO_x$ adsorption activity.

Example 5: Study to Investigate the Effect of Different Metal Elements on $CeO_2$ The effect of a range of metals other than Ru is shown in Tables 3 and 4. The data was divided into two groups, one group (Table 3) contained metals at the same weight % loading and was tested with $NO/NO_2$ feed; the other group (Table 4) contained metals at different weight % loading but identical mole % loading and was tested with the NO-only feed. Under either condition, the $Ru/CeO_2$ sample showed far higher $NO_x$ adsorption efficiency.

TABLE 3

Effect of different metals on $CeO_2$

| Supported Metal (2% wt) | Ru | Ir | Au |
|---|---|---|---|
| $NO_x$ % ads. | 45 | 12 | 10 |

TABLE 4

Effect of different metal on $CeO_2$ (NO-only feed)

| | Supported Metal, wt % | | | | | | | |
|---|---|---|---|---|---|---|---|---|
| | 3.8% Ru | 4% Pd | 7.3% Pt | 3.9% Rh | 4.1% Ag | 2.4% Cu | 2.2% Ni | 4.5% Sn |
| $NO_x$ % ads. | 25 | 10 | 12 | 9 | 3 | 5 | 1 | 1 |

All samples contain the same mole number of metal elements

Example 6: Study to Investigate the Effect of Dopant Type and Concentration on $CeO_2$ Ru was deposited at 2 wt % onto pure $CeO_2$, or $CeO_2$ doped with different oxides at 2-30 wt % loading. The $NO_x$ adsorption results are shown in Table 5. The data clearly demonstrates that 5% Si, Nd and Zr oxides and 10% Pr oxide resulted in lower $NO_x$ adsorption capacity.

TABLE 5

Dopant effect on $CeO_2$

| | Dopant | | | | | | | |
|---|---|---|---|---|---|---|---|---|
| | No dopant | 2% $SiO_2$ | 5% $SiO_2$ | 5% $Pr_6O_{11}$ | 5% $Ga_2O_3$ | 5% $Nb_2O_5$ | 10% $Pr_6O_{11}$ | 30% $ZrO_2$ |
| $NO_x$ % ads. | 46 | 48 | 18 | 53 | 51 | 8 | 31 | 29 |

Example 7: Study to Investigate the Effect of Ru Loading ON CeO$_2$

The effect of Ru concentration (0.5% to 5%) on NO$_x$ adsorption was evaluated, and the results are shown in Table 6. A slight increase in NO$_x$ adsorption was observed from 0.5% to 3% Ru, and then a gradual downward trend ensued with further increase in Ru loading.

TABLE 6

Effect of Ru % on CeO$_2$

| | Dopant | | | | |
|---|---|---|---|---|---|
| | 0.5% | 1% | 2% | 3% | 4% | 5% |
| NO$_x$ % ads. | 41 | 48 | 46 | 48 | 43 | 39 |

Figure 9:
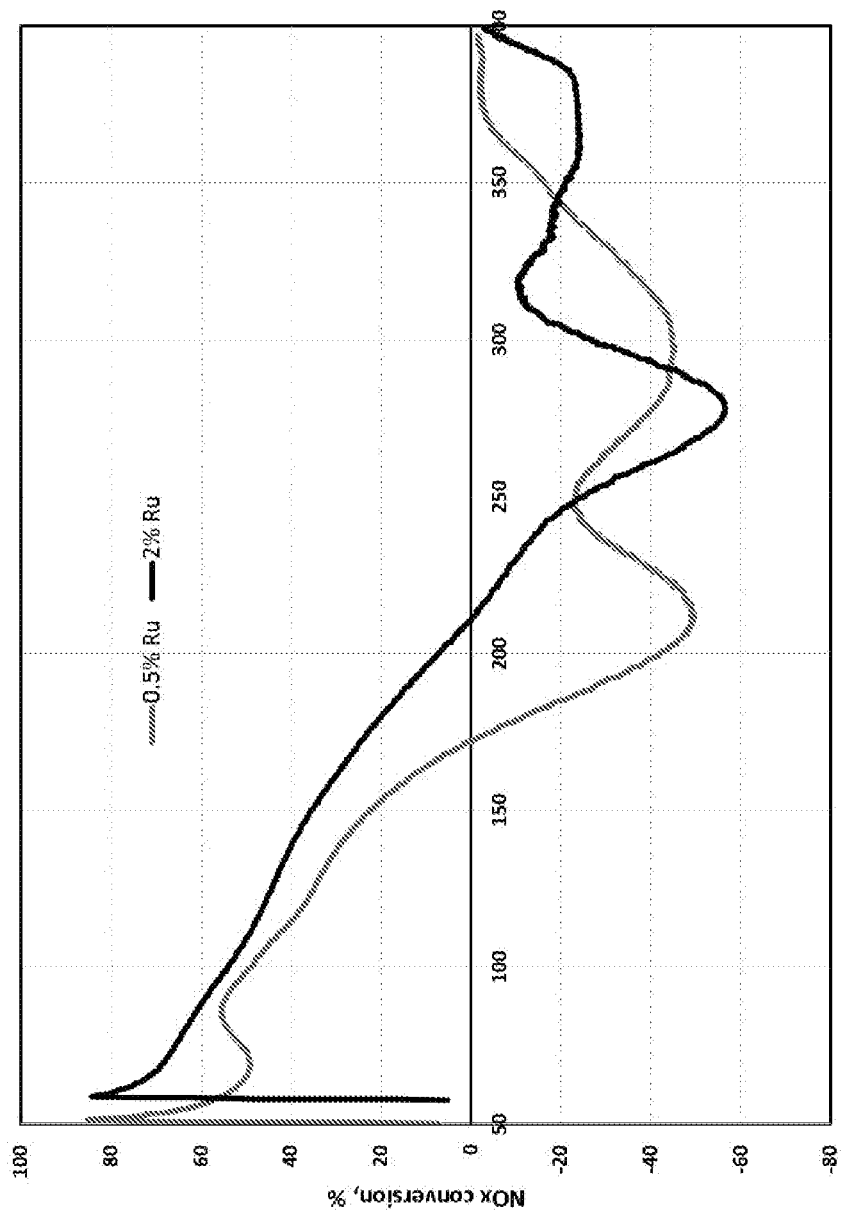
FIG. 9 is a line graph showing $NO_x$ conversion and release as a function of temperature for catalyst compositions having different ruthenium concentrations.

The Ru % loading also impacted the NO$_x$ desorption kinetics as shown in FIG. 9. At 0.5% Ru, two distinct desorption peaks were observed at 215° C. and 300° C. At 2% Ru, the low temperature peak decreased to a mere shoulder, whereas the higher temperature peak became dominant and sharper, and the peak temperature also shifted downward to ~280° C.

Example 8: Studies with Catlyst Monolith Samples

Comparative Sample: A diluted alumina binder solution was prepared by adding boehmite alumina powder (5% of total solid) to DI water while stirring. After a homogeneous solution was obtained, the CeO$_2$ carrier was added to form a slurry suspension at approximately 50% solid content. The slurry pH was adjusted with 1:1 wt/wt HNO$_3$ to pH 4-5 and milled until the final particle size D$_{90}$ reached 12-15 μm. The slurry was then coated at 42-46% solid content onto a 400/4 honeycomb substrate. After drying, the catalyst was calcined at 590° C. for 1 hour in air. The resulting washcoat loading was 2.0 g/in$^3$.

Inventive Sample: A pure ceria carrier was incipient wetness impregnated with a diluted Ru(NO)(NO$_3$)$_3$ solution, then dried in air at 110° C./2 h, followed with calcination in air at 590° C. for 1 hour. A diluted alumina binder solution was prepared by adding boehmide alumina powder (5% of total solid) to DI water, after a homogeneous solution was obtained; the calcined Ru/CeO$_2$ powder was added to form a slurry suspension at approximately 50% solid content. The slurry pH was adjusted with 1:1 wt/wt HNO$_3$ to pH 4-5, and milled until the final particle size D$_{90}$ reached 12-15 μm. The slurry was then coated at 42-46% solid content onto a 400/4 honeycomb substrate. After drying, the catalyst was calcined at 590° C. for 1 hour in air. The resulting washcoat loading was 2.0 g/in$^3$.

Example 9: Testing Procedures of Monolith Sample(s) from Example 8

The monolith catalysts were tested under transient diesel conditions using exhaust condition from a Euro VI calibrated heavy duty diesel engine. The catalyst was evaluated via six repeated cold-start WHTC tests. The concentrations of NO, NO$_2$ and NO$_x$ were simultaneously monitored by a FTIR detector at the catalyst outlet. The data shown in the following discussion were obtained from the 5$^{th}$ cycle. An uncoated monolith substrate was used for the blank experiment.

Figure 10:
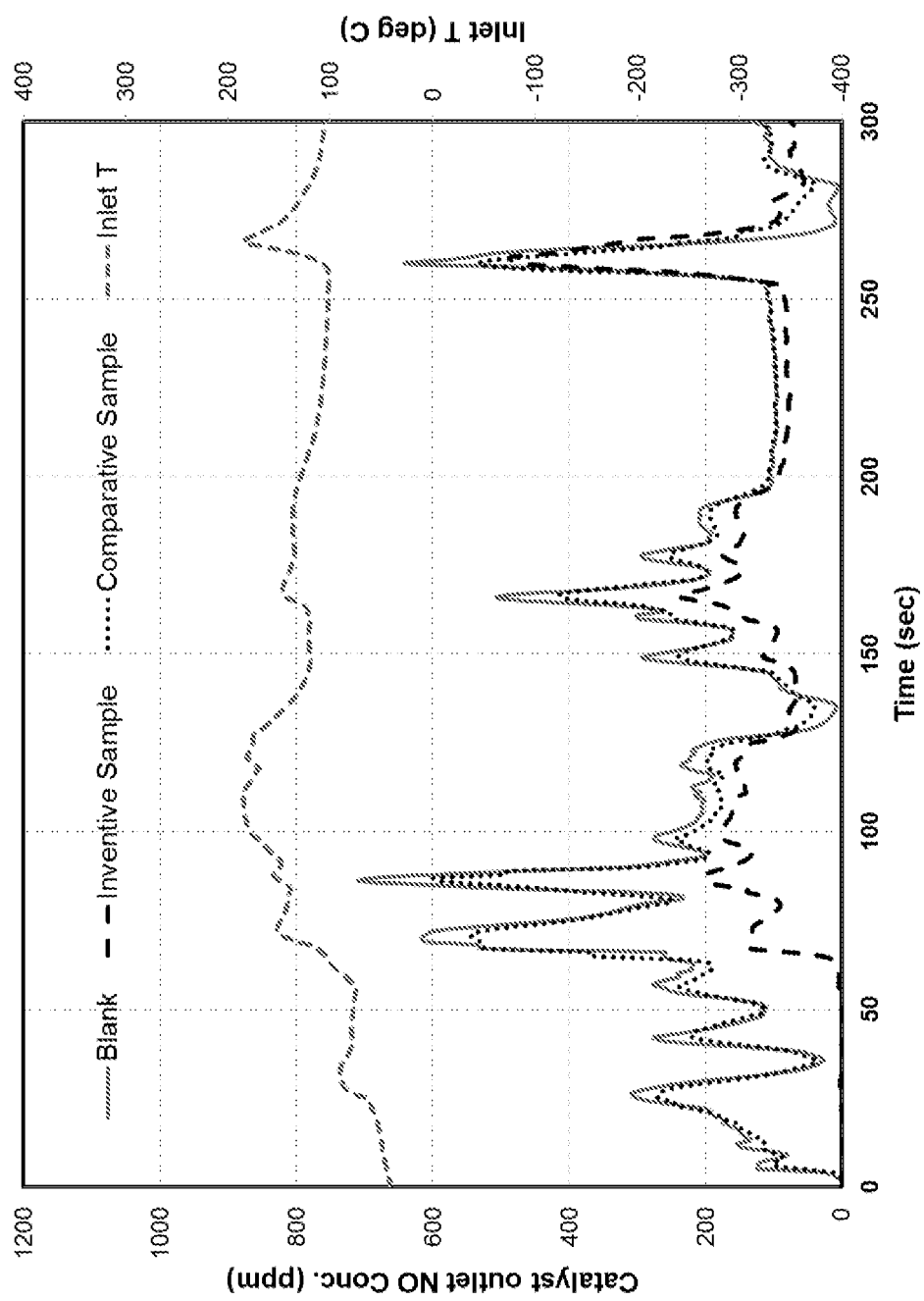
FIG. 10 is a line graph showing the catalyst outlet NO concentration as a function of time of various catalyst composition samples during 0-300 s of WHTC cycle.

FIG. 10 shows the NO concentration at the catalyst outlet during the first 300 seconds of the WHTC test, which captured the coldest temperature region where passive NO$_x$ adsorption effect can be fully evaluated. It can be seen that the inventive sample provided nearly 100% NO adsorption during 0-60 seconds when the temperature was below 100° C., whereas the comparative sample mostly tracked the blank sample in the NO concentration trace, i.e. nearly no adsorption. Although NO concentration started to increase for the inventive sample when the temperature trended higher, the inventive sample continued to show significant NO adsorption compared to the comparative sample.

Figure 11:
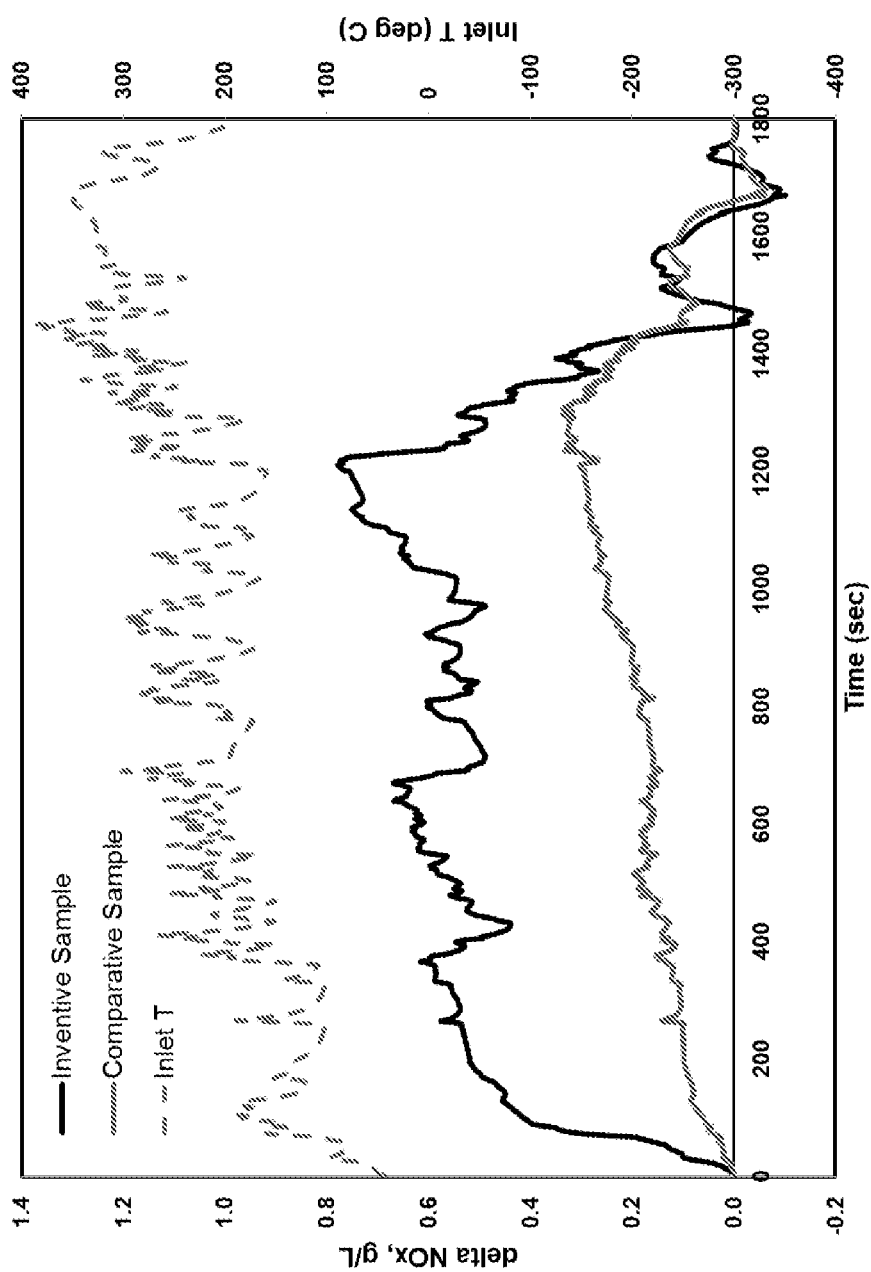
FIG. 11 is a line graph showing the difference of cumulative $NO_x$ of inlet and outlet (i.e., delta $NO_x$) as a function of time for various catalyst composition samples.

The NO$_x$ adsorption capacity was expressed in FIG. 11 as delta NO$_x$ in g/L (difference between the cumulative inlet NO$_x$ and cumulative outlet NO$_x$) during the entire WTHC test. Inventive sample showed much higher delta NO$_x$ than the comparative sample up to 1200 seconds. For the inventive sample, eventual NO$_x$ desorption completed during 1200-1400 seconds.

The NO$_x$ capacity measured as shown in FIG. 11 from six consecutive WHTC runs were compared in Table 7. For both samples the activity appeared to stabilize after the first run, i.e. all adsorbed NO$_x$ also desorbed at the completion of the cycle, the inventive sample showed twice the amount of NO$_x$ adsorption capacity as the comparative sample.

TABLE 7

NO$_x$ capacity comparison from 1-6 WHTC test runs

| | Cycle# | | | | | |
|---|---|---|---|---|---|---|
| | 1 | 2 | 3 | 4 | 5 | 6 |
| Inventive sample | 0.792 | 0.872 | 0.859 | 0.858 | 0.879 | 0.879 |
| Comparative sample | 0.398 | 0.414 | 0.420 | 0.369 | 0.399 | 0.395 |

Figure 12:
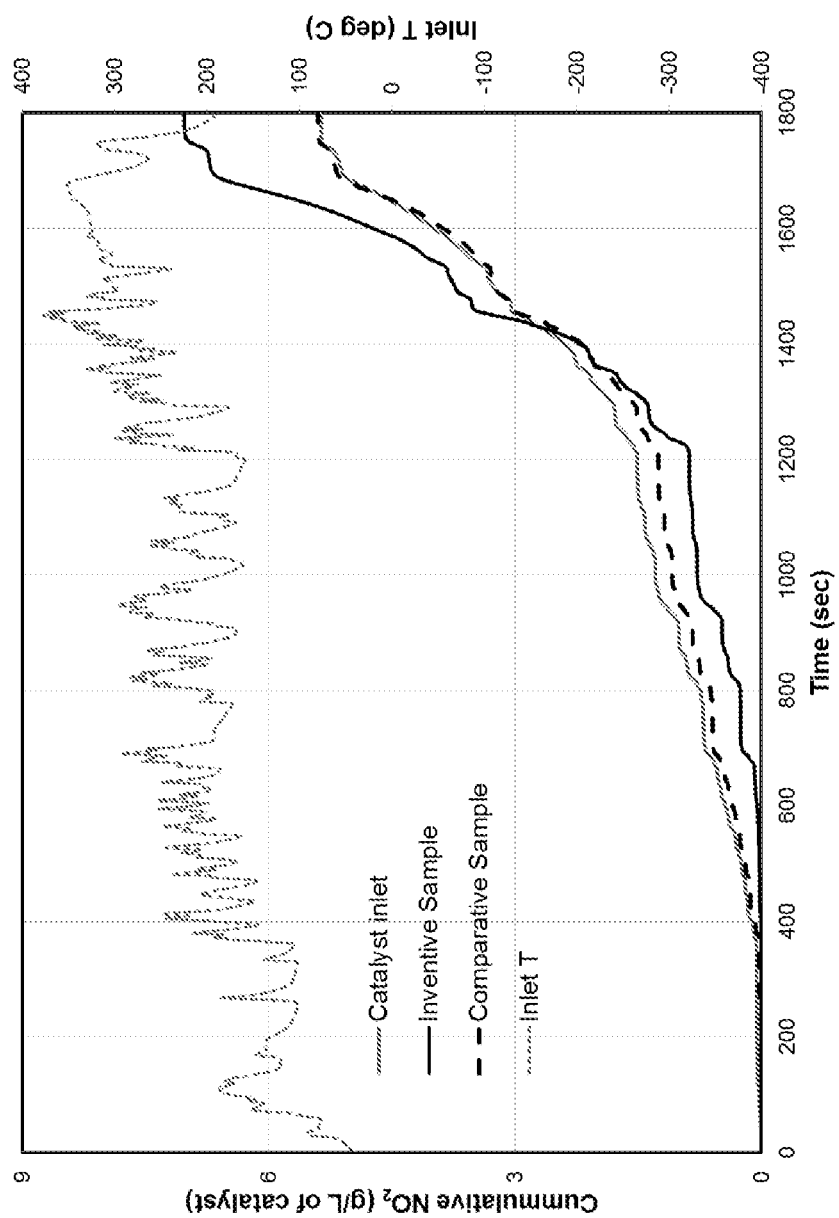
FIG. 12 is a line graph showing the cumulative $NO_2$ concentration as a function of time of various catalyst composition samples; wherein the catalyst compositions of the current invention adsorb $NO_2$ at low temperature and catalyze NO to $NO_2$ oxidation at greater than 300° C.

FIG. 12 shows the cumulative NO$_2$ (g/L) at catalyst outlet. Inventive sample showed higher NO$_2$ adsorption than the comparative sample during 0-1400 seconds; beyond 1400 seconds when the catalyst inlet temperature was consistently above 300° C., higher NO$_2$ concentration was observed at the catalyst outlet due to catalytic activity of Ru/CeO$_2$ on NO oxidation. This data confirms the finding from pure powder sample testing shown in FIG. 7.

In summary, Ru/CeO$_2$ demonstrated not only excellent NO$_x$ (both NO and NO$_2$) adsorption activity at low temperature and moderate desorption temperature, but also NO to NO$_2$ conversion activity at >300° C. It can be advantageous to apply such material onto either a DOC or a CSF catalyst situated in front of a SCR catalyst. The Ru/CeO$_2$ material adsorbed NO$_x$ from the gas phase during low temperature operation region (<200° C.) when SCR catalyst was not yet functional, desorbed NO$_x$ when temperature reaches beyond 200° C., and produced NO$_2$ at >300° C. when NO$_2$+soot reaction accelerated. The NO oxidation activity of Ru/CeO$_2$ can be useful to reduce the amount of PGM needed to produce NO$_2$ for passive soot regeneration.

That which is claimed:

1. A low-temperature NO$_x$ adsorber composition comprising:
    an active metal and a metal oxide support, wherein the metal oxide support comprises greater than 50% by weight ceria based on the total weight of the NO$_x$ adsorber composition, and wherein the active metal comprises about 0.01% to about 5% by weight ruthenium based on the total weight of the NO$_x$ adsorber composition, and wherein the metal oxide support further comprises Pr$_6$O$_{11}$ or Gd$_2$O$_3$ in an amount of about 0.1% to about 10% by weight, based on the total weight of the NO$_x$ adsorber composition.

2. The low-temperature NO$_x$ adsorber composition of claim 1, wherein the low-temperature NO$_x$ adsorber composition is substantially free of barium or zeolite.

3. The low-temperature NO$_x$ adsorber composition of claim 1, wherein the metal oxide support comprises greater than 90% by weight ceria based on the total weight of the NO$_x$ adsorber.

4. The low-temperature NO$_x$ adsorber composition of claim 1, wherein the NO$_x$ adsorber composition comprises a surface concentration of active Ru ions of at least 0.5% by weight based on the total weight of the NO$_x$ adsorber composition.

5. The low-temperature NO$_x$ adsorber composition of claim 1, wherein the NO$_x$ adsorber composition adsorbs NO from the exhaust gas stream at a temperature of about 50° C. to about 200° C. in an amount of at least 30-60% by weight based on the total amount of NO present in the exhaust gas stream.

6. The low-temperature NO$_x$ adsorber composition of claim 1, wherein the NO$_x$ adsorber composition oxidizes NO present in the exhaust gas steam to NO$_2$ at a temperature ranging from about 300° C. to about 600° C.

7. The low-temperature NO$_x$ adsorber composition of claim 1, wherein the NO$_x$ adsorber composition releases NO back into the exhaust gas stream at a temperature of about 170° C. to about 300° C. in an amount of at least 55 to about 100% by weight based on the total amount of NO adsorbed onto the NO$_x$ adsorber composition.

8. The low-temperature NO$_x$ adsorber composition of claim 1, wherein the NO$_x$ adsorber composition is substantially free of any additional active metal.

9. The low-temperature NO$_x$ adsorber composition of claim 1, wherein the NO$_x$ adsorber composition is comprised in a lean NO$_x$ trap.

10. The catalyst article of claim 9, further comprising a second catalyst composition, wherein the second catalyst composition comprises a DOC catalyst composition or a LNT catalyst composition; and
wherein the second catalyst composition is layered or zoned on the substrate carrier with the NO$_x$ adsorber catalyst composition.

11. The catalyst article of claim 10, wherein the second catalyst composition is disposed directly on the substrate carrier.

12. A catalyst article comprising a catalyst substrate carrier having a plurality of channels adapted for gas flow and a low temperature NO$_x$ adsorber composition according to claim 1 positioned to contact an exhaust gas passing through each channel.

13. The catalyst article of claim 12, wherein the substrate carrier is a metal or ceramic honeycomb.

14. The catalyst article of claim 13, wherein the honeycomb is a wall flow filter substrate or a flow through substrate.

15. The catalyst article of claim 13, wherein the low temperature NO$_x$ adsorber composition is applied to the substrate carrier with a loading of at least about 0.5 g/in$^3$.

16. The catalyst article of claim 12, wherein the active metal is present in an amount of about 10 to about 200 g/ft$^3$.

17. An exhaust gas treatment system comprising a low-temperature NO$_x$ adsorber composition according to claim 1 and an SCR catalyst disposed downstream from an internal combustion engine.

18. The exhaust gas treatment system of claim 17, wherein the low-temperature NO$_x$ adsorber composition is present on a substrate carrier positioned upstream of the SCR catalyst.

19. The exhaust gas treatment system of claim 17, wherein the low-temperature NO$_x$ adsorber composition and SCR catalyst are disposed on the same substrate carrier.

20. The exhaust gas treatment system of claim 17, wherein the internal combustion engine is a gasoline or a diesel engine.

* * * * *